(12) United States Patent
Meir

(10) Patent No.: US 8,341,331 B2
(45) Date of Patent: Dec. 25, 2012

(54) METHOD, APPARATUS AND COMPUTER READABLE MEDIUM FOR STORING DATA ON A FLASH DEVICE USING MULTIPLE WRITING MODES

(75) Inventor: Avraham Meir, Rishon Le Zion (IL)

(73) Assignee: SanDisk IL Ltd., Kfar Saba (IL)

( * ) Notice: Subject to any disclaimer, the term of this patent is extended or adjusted under 35 U.S.C. 154(b) by 1067 days.

(21) Appl. No.: 12/100,476

(22) Filed: Apr. 10, 2008

(65) Prior Publication Data

US 2009/0259797 A1    Oct. 15, 2009

(51) Int. Cl.
*G06F 13/00* (2006.01)
(52) U.S. Cl. ........................................ 711/103
(58) Field of Classification Search .......... 711/103, 711/133
See application file for complete search history.

(56) References Cited

U.S. PATENT DOCUMENTS

| | | | |
|---|---|---|---|
| 7,353,325 B2 * | 4/2008 | Lofgren et al. | 711/103 |
| 7,535,759 B2 | 5/2009 | Roohparvar | 365/185.03 |
| 2005/0192923 A1 * | 9/2005 | Nakatsuka | 707/1 |
| 2005/0273548 A1 * | 12/2005 | Roohparvar | 711/103 |
| 2005/0273549 A1 * | 12/2005 | Roohparvar | 711/103 |
| 2006/0004952 A1 * | 1/2006 | Lasser | 711/103 |
| 2007/0061502 A1 | 3/2007 | Lasser et al. | 711/103 |
| 2007/0294490 A1 * | 12/2007 | Freitas et al. | 711/154 |
| 2008/0098193 A1 * | 4/2008 | Im et al. | 711/170 |

* cited by examiner

*Primary Examiner* — Edward Dudek, Jr.
*Assistant Examiner* — Sean D Rossiter
(74) *Attorney, Agent, or Firm* — Martine Penilla Group, LLP

(57) ABSTRACT

Methods, apparatus and computer readable medium for writing data into a flash memory device are disclosed. In some embodiments, the data is written in a writing mode selected in accordance with an extent to which the flash memory storage device or a flash die thereof is full of previously-stored data. The presently disclosed techniques may be implemented on the "device-side" (for example, by a device controller of the flash device) and/or on the "host-side." In some embodiments, the selected writing mode is a bits-per-cell density mode. In some embodiments, the selected writing mode is a "slower" or "faster" writing mode. The presently disclosed techniques relate to SBC as well as MBC devices.

44 Claims, 20 Drawing Sheets

METHOD, APPARATUS AND COMPUTER READABLE MEDIUM FOR STORING DATA ON A FLASH DEVICE USING MULTIPLE WRITING MODES

FIELD OF THE INVENTION

The present invention relates to methods, apparatus and a computer readable medium for storing data on a flash device, for example, a multi-bit cell flash memory device.

BACKGROUND AND RELATED ART

Single Bit and Multi-Bit Flash Memory Cells

Flash memory devices have been known for many years. In many "traditional" flash memory devices, each memory cell within a flash memory device stores one bit of information. Thus, the traditional way to store a bit in a flash memory cell has been by supporting two states of the memory cell. One state represents a logical "0" and the other state represents a logical "1".

In a flash memory cell, the two states are implemented by having a floating gate situated above the cell's channel (the area connecting the source and drain elements of the cell's transistor), and having two valid states for the amount of charge stored within the floating gate. Typically, one state is with zero charge in the floating gate and is the unwritten state of the cell after being erased (commonly defined to represent the "1" state) and the other state is with some amount of negative charge in the floating gate (commonly defined to represent the "0" state). Having negative charge in the gate causes the threshold voltage of the cell's transistor (i.e. the voltage that has to be applied to the transistor's control gate in order to cause the transistor to conduct) to increase. It is possible to read the stored bit by checking the threshold voltage of the cell. If the threshold voltage is in the higher state then the bit value is "0" and if the threshold voltage is in the lower state then the bit value is "1". Actually there is no need to accurately read the cell's threshold voltage. All that is needed is to correctly identify in which of the two states the cell is currently located. For this purpose it is sufficient to compare the threshold voltage of the cell to a reference voltage that is between the two states, and to determine if the cell's threshold voltage is below or above the reference value.

FIG. 1A (prior art) shows graphically how this works. Specifically, FIG. 1A shows a distribution of the threshold voltages of a large population of cells. Because the cells in a flash device are not exactly identical in their characteristics and behavior (due to, for example, small variations in impurity concentrations or defects in the silicon structure), applying the same programming operation to all of the cells does not cause all of the cells to have exactly the same threshold voltage. Instead, the threshold voltage is distributed as shown in FIG. 1A. Cells storing a value of "1" typically have a negative threshold voltage, such that most of the cells have a threshold voltage close to the central voltage value of the left peak (labeled 1) of FIG. 1A, with fewer cells having threshold voltages lower or higher than the central voltage of the left peak. Similarly, cells storing a value of "0" typically have a positive threshold voltage, such that most of the cells have a threshold voltage close to the central voltage of the right peak (labeled 0) of FIG. 1A, with fewer cells having threshold voltages lower or higher than the central voltage of the right peak.

In recent years, a new kind of flash device has appeared on the market, using "Multi Level Cells" (MLC). The term "Multi-Level Cell" is misleading because flash memory with a single bit per cell uses multiple i.e. two levels, as described above. Therefore, the term "Single Bit Cell" (SBC) is used hereinafter to refer to a memory cell of two levels and the term "Multi-Bit Cell" (MBC) is used hereinafter to refer to a memory cell of more than two levels, i.e. more than one bit per cell. The most common MBC flash memories at present are ones with two bits per cell, and therefore examples are given below using such MBC memories. It should however be understood that the present disclosure is equally applicable to flash memory devices that support more than two bits per cell. A single MBC cell storing two bits of information is in one of four different states. As the cell's "state" is represented by the cell's threshold voltage, an MBC cell supports four different valid ranges for the cell's threshold voltage. FIG. 1B (prior art) shows the threshold voltage distribution for a typical MBC cell of two bits per cell. As expected, FIG. 1B has four peaks, each peak corresponding to one state. As for the SBC, each state is actually a voltage range and not a single voltage. When reading the cell's contents, the cell's threshold voltage must be correctly identified in a definite voltage range. A cell designed for MBC operation e.g. in four states is typically operable as an SBC cell with two states. For example, it is known that MBC and SBC modes may co-exist within the same device. Thus, one may designate certain parts of the device to operate with highest density in MSC mode, while other parts are used in SDC mode to provide better performance.

MBC devices provide a significant cost advantage. An MSC device with two bits per cell requires about half the area of a silicon wafer than an SBC of similar capacity. However, there are drawbacks to using MBC flash. Average read and write times of MBC memories are longer than of SBC memories, resulting in worse performance. Also, the reliability of MSC is lower than SDC. The differences between the threshold voltage ranges in SMC are much smaller than in SBC. Thus, a disturbance in the threshold voltage (e.g. leakage of stored charge causing a threshold voltage drift or interference from operating neighboring cells) that are insignificant in SBC because of the large gap between the two states, may cause an SBC cell to move from one state to another, resulting in an erroneous bit. The end result is a lower performance specification of SAC cells in terms of data retention time or the endurance of the device to many write/erase cycles.

A First Discussion of Flash Pulse Parameters

The previous section related to MBC devices and "hybrid" devices including both multi-bit and single bit cells. The next three sections relate to both MBC devices, hybrid devices, and SBC-only devices.

FIGS. 1C and 1D illustrate the storage of a bit, either a zero bit or a one bit, in a cell of a flash memory. The examples of FIG. 1C-1D relate to SBC memories. For historical reasons, this process of storing data in a flash memory is called "programming" the flash memory. Nominally, a zero bit is represented by a cell threshold voltage $V_0$ and a one bit is represented by a cell threshold voltage $V_1$. Initially, the cell has a nominal threshold voltage $V_1$. For example, after a block of a flash memory has been erased, all the cells have nominal threshold voltages $V_1$. Because of unavoidable inaccuracies in the initializations of the cells, the actual threshold voltages are distributed around the nominal threshold voltage $V_1$ according to a distribution curve 10. Then, to each cell that is to store a zero bit, a train 12 of programming voltage pulses 14 is applied, in order to inject electrons from the cell's silicon substrate through the cell's oxide layer into the cell's floating gate. Because the electrons move through the oxide layer by quantum mechanical tunneling or by hot injection, and because of non-uniformities in the cells' structures, the voltage required to inject enough electrons to increase the threshold voltage from $V_1$ to $V_0$ cannot be predicted accurately in advance. The voltage of the first pulse 14 is a starting voltage $V_S$+ a programming voltage increment $?V$. Every subsequent pulse 14 is higher than its predecessor by $?V$. After each pulse 14 is applied, the cell is tested to see if its threshold voltage is sufficiently close to $V_0$. If the threshold voltage is sufficiently close to $V_0$ then the programming of cell is complete. Otherwise, the next pulse 14 is applied to the cell and the threshold voltage of the cell again is tested. Because the initial threshold voltages are distributed about the nominal voltage $V_1$, and because of inaccuracies in the programming, the threshold voltages of the cells that store zero bits also are distributed about the nominal threshold voltage $V_0$, according to a distribution curve 16.

Data are read from the flash memory cells by sensing the cells' threshold voltages. A threshold voltage greater than a transition threshold voltage $V_T$ halfway between $V_0$ and $V_1$ is interpreted as a zero bit. A threshold voltage less than $V_T$ is interpreted as a one bit. Over time, primarily because of the tunneling of electrons from the floating gates back to the substrate, the distributions 10 and 16 tend to become broader. The difference between threshold voltages $V_0$ and $V_1$ is selected to be great enough so that, over the lifetime of the flash memory, the likelihoods that the lower end 18 of distribution 16 will descend below $V_T$ and that the upper end 20 of distribution 10 will ascend above $V_T$ are negligible.

A Discussion of Flash Pulse Parameters and "Slow" vs. "Fast" Writing Modes

FIGS. 1E and 1F illustrate the programming of a zero bit in a cell of a flash memory according to a writing mode that is a "slow" writing mode relative to the writing mode illustrated in FIGS. 1C-1D. A train 22 of programming voltage pulses with a programming voltage increment twice as large as the programming voltage increment $?V$ of FIG. 1C is applied to the cell until the threshold voltage of the cell is sufficiently close to $V_0$. The cell of FIGS. 1E and 1F is programmed in less time than the cell of FIGS. 1C and 1D. In some situations, this "speed benefit" may be obtained at the expense of the distribution 24 of the resulting threshold voltages around $V_0$ being wider than distribution 16, which is shown in FIG. 1E in phantom for reference. Thus, the programming technique of FIGS. 1E-1F provides a relatively "fast" writing mode as compared to the relatively "slow" writing mode of FIGS. 1C-1D.

As noted above, average read and write times of MBC memories are longer than of SBC memories, resulting in worse performance. Thus, writing data to an SBC memory may provide a relatively "fast" writing mode compared to writing data to an MBC memory. Furthermore, writing data using the programming technique of FIGS. 1E-1F provides a relatively "fast" writing mode compared to writing data using the programming technique of FIGS. 1C-1D.

The skilled artisan will appreciate that these are just two examples, and that there are other ways in the art to obtain relatively "slow writing modes" and relatively "fast writing modes." Furthermore, although the discussion of FIGS. 1C-1F related to the specific case of SBCs, it is appreciated that the principles described with reference to FIGS. 1C-1F are equally applicable to MBCs.

A Discussion of Flash Devices Coupled to Host Devices

FIG. 2A is a block diagram of an exemplary system including a host device 310 and a flash memory device 260. The host device 310 and the flash memory device 260 are coupled via respective device ports 350, 250 and communicate via communications link 300.

In different implementations, host device 310 sends to flash memory storage device 260 requests to read data stored in flash memory 270 and/or to write data to flash memory 270.

When data is written to flash memory 270 to a particular logical and/or physical location(s) within flash memory 270, one or more storage system data structure(s) (NOT SHOWN IN FIG. 2A) (for example, flash management tables) are updated to indicate that the logical and/or physical location within the flash is "occupied" or "full." In the case of systems including multi-bit flash memory cells, the storage system data structure(s) may be updated to indicate how many bits are stored in a particular flash memory cell.

When data is erased from a particular logical and/or physical location within the flash, the one or more storage system data structure(s) (for example, flash management tables) are updated to indicate that the logical and/or physical location within the flash that was previously "occupied" or "full" is now "vacant" or "empty." Thus, it is possible to determine the extent to which flash storage device is full of previously-written data by looking up this information in the storage system data structure(s).

Thus, any a given point in time, the storage system data structure(s) indicate "how full" flash device 260 (in particular flash memory 270) at the point in time.

There is no limitation on the location of the storage system data structure(s) (NOT SHOWN) and/or how the storage system data structure(s) are updated. In some implementations, the flash controller 280 and/or host device 310 are operative to update the storage system data structure(s) when data is written and/or erased to flash memory 270. In some implementations, the storage system data structure(s) reside in the flash memory 270 and/or elsewhere within the flash device 260. Alternatively or additionally, the storage system data structure(s) reside on the "host side."

Multi-Die Flash Devices

Although flash memory 270 is illustrated as a single unit in FIG. 2A, it is appreciated by the skilled artisan that flash memory 270 may reside on a single die or may reside on multiple dies. FIG. 2B (prior art) is a block diagram of a multi-die flash memory 270 that includes N flash dies, where N is a positive integer. On each flash die resides a plurality of flash memory cells (not shown in FIG. 2B).

SUMMARY OF EMBODIMENTS OF THE INVENTION

Various embodiments address these and related issues, examples of which embodiments, including methods and systems, are provided herein. One embodiment is a method of writing data into a flash memory storage device. This method comprises: a) receiving incoming data, by the flash memory storage device, from a source external to the storage device; b) determining an extent to which the flash memory storage device is full of previously stored data; c) in accordance at least in part with the determined extent, selecting a bits-per-cell density mode; and d) in response to the receiving of the incoming data, storing the received incoming data in the flash memory storage device using the selected bits-per-cell density mode.

According to some embodiments, the method is carried out without, before the storing of step (d), storing the incoming data in the flash memory storage device using a bits-per-cell density mode other than the selected bits-per-cell density mode.

According to some embodiments, the selecting is carried out in response to the receiving of the data of step (a).

According to some embodiments, the selecting is carried out before the receiving of the data of step (a).

According to some embodiments, the selecting of the bits-per-cell density mode includes: i) if the extent to which the storage device is full of the previously-stored data is less than a particular threshold, selecting a first bits-per-cell density mode; and ii) otherwise, selecting a second bits-per-cell density mode that stores more bits per cell than the first bits-per-cell density mode.

According to some embodiments, the determining of the extent to which the storage device is full of previously stored data includes at least one of: i) determining a fraction of the storage device that is full of the previously stored data; ii) determining an absolute amount of previously-stored data stored in the storage device; and iii) determining an amount of free space on the storage device.

According to some embodiments, the selecting of the bits-per-cell density mode includes: i) if the extent to which the storage device is full of previously stored data is below a first threshold, selecting a first bits-per-cell density mode; ii) if the extent to which the storage device is full of previously stored data exceeds the first threshold but is below a second threshold, selecting a second bits-per-cell density mode that stores more bits per cell than the first bits-per-cell density mode; and iii) if the extent to which the storage device is full of previously stored data exceeds the second threshold, selecting a third bits-per-cell density mode that stores more bits per cell than the second bits-per-cell density mode.

According to some embodiments, the method further comprises: e) reading at least some of the previously-stored data which is stored in a first bits-per-cell density mode; and f) re-writing at least some of the read data in the storage device in a second bits-per cell density mode which stores more bits per cell than the first bits-per-flash-cell density mode.

According to some embodiments, the reading and the re-writing of data is effected by a background process.

According to some embodiments, the method further comprises: g) receiving additional incoming data, by the flash memory storage device, from the source external to the storage device; and wherein the reading and re-writing is in response to the receiving of the additional incoming data.

One embodiment is a method of writing data into a flash memory storage device. This method comprises: a) receiving incoming data, by the flash memory storage device, from a source external to the storage device; b) determining an extent to which the flash memory storage device is full of previously stored data; c) in accordance at least in part with the determined extent, selecting a writing speed mode; and d) in response to the receiving of the incoming data, storing the received incoming data in the flash memory storage device using the selected writing speed mode.

According to some embodiments, the selecting of the writing speed mode includes: i) if the extent to which the storage device is full of the previously-stored data is less than a particular threshold, selecting a first writing speed mode; and ii) otherwise, selecting a second writing speed mode that is slower than the first writing speed mode.

According to some embodiments, the method is carried out without, before the storing of step (d), storing the incoming data in the flash memory storage device using a writing speed mode other than the selected writing speed mode.

According to some embodiments, the selecting is carried out in response to the receiving of the data of step (a).

According to some embodiments, the selecting is carried out before the receiving of the data of step (a).

According to some embodiments, the determining of the extent to which the storage device is full of previously stored data includes at least one of: i) determining a fraction of the storage device that is full of the previously stored data; ii) determining an absolute amount of previously-stored data stored in the storage device; and iii) determining an amount of free space on the storage device.

According to some embodiments, the selecting of the writing speed mode includes: i) if the extent to which the storage device is full of previously stored data is below a first threshold, selecting a first writing speed mode; ii) if the extent to which the storage device is full of previously stored data exceeds the first threshold but is below a second threshold, selecting a second writing speed mode that is slower than the first writing speed mode; and iii) if the extent to which the storage device is full of previously stored data exceeds the second threshold, selecting a third writing speed mode that is slower than the second writing speed mode.

According to some embodiments, the method further comprises: e) reading at least some of the previously-stored data which was stored using a first writing speed mode; and f) re-writing at least some of the read data in the storage device using a second writing speed mode which is slower than the first writing speed mode.

According to some embodiments, the reading and the re-writing of data is effected by a background process.

According to some embodiments, the method further comprises: g) receiving additional incoming data, by the flash memory storage device, from the source external to the storage device; and wherein the reading and re-writing is in response to the receiving of additional incoming data.

One embodiment is a method of writing data into a flash memory storage device by a host device coupled to the flash memory storage device. This method comprises: a) determining, by the host device, an extent to which the flash memory storage device is full of previously stored data; b) in accordance at least in part with the determined extent, selecting, by the host device, a bits-per-cell density mode; c) sending the data-to-be-written from the host device to the flash memory storage device; and d) sending an external command from the host device to the flash memory storage device to store the sent data in the flash memory storage device using the selected bits-per-cell density mode.

According to some embodiments, the determining, by the host device, of the extent to which the storage device is full of previously stored data includes at least one of: i) determining a fraction of the storage device that is full of the previously stored data; ii) determining an absolute amount of previously-stored data stored in the storage device; and iii) determining an amount of free space on the storage device.

According to some embodiments, the selecting of the bits-per-cell density mode includes: i) if the extent to which the storage device is full of previously stored data is below a first threshold, selecting a first bits-per-cell density mode; ii) if the extent to which the storage device is full of previously stored data exceeds the first threshold but is below a second threshold, selecting a second bits-per-cell density mode that stores more bits per cell than the first bits-per-cell density mode; and iii) if the extent to which the storage device is full of previously stored data exceeds the second threshold, selecting a third bits-per-cell density mode that stores more bits per cell than the second bits-per-cell density mode.

One embodiment is a flash memory device comprising: a) a device interface for coupling with a host device; b) a flash memory; and c) a flash controller operative to: i) receive incoming data from the host device via the device interface; ii) determine an extent to which the flash memory is full of previously stored data; iii) in accordance at least in part with the determined extent, select a bits-per-cell density mode; and iv) in response to the receiving of the incoming data of (i), store the received incoming data in the flash memory using the selected bits-per-flash-cell density mode.

According to some embodiments, the flash controller is operative to carry out steps (i)-(iv) without before the carrying out of step (iv), storing the data in the flash memory storage device using a bits-per-cell density mode other than the selected bits-per-cell density mode.

According to some embodiments, the flash controller is operative to carry out the selecting in response to the receiving of the data of step (i).

According to some embodiments, the flash controller is operative to carry out the selecting before the receiving of the data of step (i).

According to some embodiments, the flash controller is operative such that the selecting of the bits-per-cell density mode includes: A) if the extent to which the storage device is full of the previously-stored data is less than a particular threshold, selecting a first bits-per-cell density mode; and B) otherwise, selecting a second bits-per-cell density mode that stores more bits per cell than the first bits-per-cell density mode.

According to some embodiments, the flash controller is operative such that the determining of the extent to which the storage device is full of previously stored data includes at least one of: A) determining a fraction of the storage device that is full of the previously stored data; B) determining an absolute amount of previously-stored data stored in the storage device; and C) determining an amount of free space on the storage device.

According to some embodiments, the flash controller is operative such that the selecting of the bits-per-cell density mode includes: A) if the extent to which the storage device is full of previously stored data is below a first threshold, selecting a first bits-per-cell density mode; B) if the extent to which the storage device is full of previously stored data exceeds the first threshold but is below a second threshold, selecting a second bits-per-cell density mode that stores more bits per cell than the first bits-per-cell density mode; and C) if the extent to which the storage device is full of previously stored data exceeds the second threshold, selecting a third bits-per-cell density mode that stores more bits per cell than the second bits-per-cell density mode.

According to some embodiments, the flash controller is further operative to: v) read at least some of the previously-stored data which is stored in a first bits-per-cell density mode; and vi) re-write at least some of the read data in the storage device in a second bits-per cell density mode which stores more bits per cell than the first bits-per-flash-cell density mode.

According to some embodiments, the flash controller is operative to effect the reading and the re-writing of data in the background.

According to some embodiments, the flash controller is further operative to: vii) receive additional incoming data, by the flash memory storage device, from the source external to the storage device; and wherein the reading and re-writing is in response to the receiving of the additional incoming data.

One embodiment is a flash memory device comprising: a) a device interface for coupling with a host device; b) a flash memory; and c) a flash controller operative to: i) receive incoming data from the host device via the device interface; ii) determine an extent to which the flash memory is fill of previously stored data; iii) in accordance at least in part with the determined extent, select a writing speed mode; and iv) in response to the receiving of the incoming data of (i), store the received incoming data in the flash memory using the selected writing speed mode.

According to some embodiments, the flash controller is operative to carry out steps (i)-(iv) without, before the carrying out of step (iv), storing the data in the flash memory storage device using a writing speed mode other than the selected writing speed mode.

According to some embodiments, the flash controller is operative to carry out the selecting in response to the receiving of the data of step (i).

According to some embodiments, the flash controller is operative to carry out the selecting before the receiving of the data of step (i).

According to some embodiments, the flash controller is operative such that the selecting of the writing speed mode includes: A) if the extent to which the storage device is full of the previously-stored data is less than a particular threshold, selecting a first writing speed mode; and B) otherwise, selecting a second writing speed mode that is slower than the first writing speed mode.

According to some embodiments, the flash controller is operative such that the determining of the extent to which the storage device is full of previously stored data includes at least one of: A) determining a fraction of the storage device that is full of the previously stored data; B) determining an absolute amount of previously-stored data stored in the storage device; and C) determining an amount of free space on the storage device.

According to some embodiments, the flash controller is operative such that the selecting of the writing speed mode includes: A) if the extent to which the storage device is full of previously stored data is below a first threshold, selecting a first writing speed mode; B) if the extent to which the storage device is full of previously stored data exceeds the first threshold but is below a second threshold, selecting a second writing speed mode that is slower than the first writing speed mode; and C) if the extent to which the storage device is full of previously stored data exceeds the second threshold, selecting a third writing speed mode that is slower than the second writing speed mode.

According to some embodiments, the flash controller is further operative to: v) read at least some of the previously-stored data which is stored in a first writing speed mode; and vi) re-write at least some of the read data in the storage device in a second writing speed mode that is slower than the first writing speed mode.

According to some embodiments, the flash controller is operative to effect the reading and the re-writing of data in a background process.

According to some embodiments, the flash controller is further operative to: vii) receive additional incoming data, by the flash memory storage device, from the source external to the storage device; and wherein the reading and re-writing is in response to the receiving of the additional incoming data.

One embodiment is a method of writing data into a flash memory storage device by a host device coupled to the flash memory storage device. This method comprises: a) determining, by the host device, an extent to which the flash memory storage device is full of previously stored data; b) in accordance at least in part with the determined extent selecting, by the host device, a writing speed mode; c) sending the data-to-be-written from the host device to the flash memory storage device; and d) sending an external command from the host device to the flash memory storage device to store the sent data in the flash memory storage device using the selected writing speed mode.

According to some embodiments, the determining, by the host device, of the extent to which the storage device is full of previously stored data includes at least one of: i) determining a fraction of the storage device that is full of the previously stored data; ii) determining an absolute amount of previously-stored data stored in the storage device; and iii) determining an amount of free space on the storage device.

According to some embodiments, the selecting of the writing speed mode includes: i) if the extent to which the storage device is full of previously stored data is below a first threshold, selecting a first writing speed mode; ii) if the extent to which the storage device is full of previously stored data exceeds the first threshold but is below a second threshold, selecting a second writing speed mode that is slower than the first writing speed mode; and iii) if the extent to which the storage device is full of previously stored data exceeds the second threshold, selecting a third writing speed mode that is slower than the second writing speed mode.

One embodiment is a host device comprising: a) a host-side storage for storing data; b) a host-side processor; c) a host-side interface for coupling with a flash memory device; and d) driver code residing in the host-side storage, wherein execution of the driver code by the host-side processor is operative to: i) determine an extent to which the coupled flash memory storage device is full of previously stored data; ii) in accordance at least in part with the determined extent, select a bits-per-cell density mode; iii) send data-to-be-stored to the coupled flash memory device via the host-side interface; and iv) send an external command via the host-side interface to the flash memory storage device to store the sent data in the flash memory storage device using the selected bits-per-cell density mode.

According to some embodiments, the driver code is operative such that, when executed by the host-side processor, the determining of the extent to which the storage device is full of previously stored data includes at least one of: i) determining a fraction of the storage device that is full of the previously stored data; ii) determining an absolute amount of previously-stored data stored in the storage device; and iii) determining an amount of free space on the storage device.

According to some embodiments, the driver code is operative such that, when executed by the host-side processor, the selecting of the bits-per-cell density mode includes: i) if the extent to which the storage device is full of previously stored data is below a first threshold, selecting a first bits-per-cell density mode; ii) if the extent to which the storage device is full of previously stored data exceeds the first threshold but is below a second threshold, selecting a second bits-per-cell density mode that stores more bits per cell than the first bits-per-cell density mode; and iii) if the extent to which the storage device is full of previously stored data exceeds the second threshold, selecting a third bits-per-cell density mode that stores more bits per cell than the second bits-per-cell density mode.

One embodiment is a host device comprising: a) a host-side storage for storing data; b) a host-side processor; c) a host-side interface for coupling with a flash memory device; and d) driver code residing in the host-side storage, wherein execution of the driver code by the host-side processor is operative to i) determine an extent to which the coupled flash memory storage device is full of previously stored data; ii) in accordance at least in part with the determined extent, select a writing speed mode; iii) send data-to-be-stored to the coupled flash memory device via the host-side interface; and iv) send an external command via the host-side interface to the flash memory storage device to store the sent data in the flash memory storage device using the selected writing speed mode.

According to some embodiments, the driver code is operative such that, when executed by the host-side processor, the determining of the extent to which the storage device is full of previously stored data includes at least one of: i) determining a fraction of the storage device that is full of the previously stored data; ii) determining an absolute amount of previously-stored data stored in the storage device; and iii) determining an amount of free space on the storage device.

According to some embodiments, the driver code is operative such that, when executed by the host-side processor, the selecting of the writing speed mode includes: i) if the extent to which the storage device is full of previously stored data is below a first threshold, selecting a first writing speed mode; ii) if the extent to which the storage device is full of previously stored data exceeds the first threshold but is below a second threshold, selecting a second writing speed mode that is slower than the first writing speed mode; and iii) if the extent to which the storage device is full of previously stored data exceeds the second threshold, selecting a third writing speed mode that is slower than the second writing speed mode.

One embodiment is disclosed for the first time a computer readable medium having stored thereon computer readable program code for writing data into a flash memory storage device. The program code is operable to: a) receive incoming data, by the flash memory storage device, from a source external to the storage device; b) determine an extent to which the flash memory storage device is full of previously stored data; c) in accordance at least in part with the determined extent, select a bits-per-cell density mode; and d) in response to the receiving of the incoming data, store the received incoming data in the flash memory storage device using the selected bits-per-cell density mode.

One embodiment is a computer readable medium having stored thereon computer readable program code for writing data into a flash memory storage device. The program code is operable to a) receive incoming data, by the flash memory storage device, from a source external to the storage device; b) determine an extent to which the flash memory storage device is full of previously stored data; c) in accordance at least in part with the determined extent, select a writing speed mode; and d) in response to the receiving of the incoming data, store the received incoming data in the flash memory storage device using the selected writing speed mode.

One embodiment is a computer readable medium having stored thereon computer readable program code for writing data into a flash memory storage device by a host device coupled to the flash memory storage device. The program code is operable, upon execution by the host device, to cause the host device to: a) determine an extent to which the flash memory storage device is full of previously stored data; b) in accordance at least in part with the determined extent select a bits-per-cell density mode; c) send the data-to-be-written from the host device to the flash memory storage device; and d) send an external command to the flash memory storage device to store the sent data in the flash memory storage device using the selected bits-per-cell density mode.

One embodiment is a computer readable medium having stored thereon computer readable program code for writing data into a flash memory storage device by a host device coupled to the flash memory storage device. The program code is operable, upon execution by the host device, to cause the host device to: a) determine, by the host device, an extent to which the flash memory storage device is full of previously stored data; b) in accordance at least in part with the determined extent, select, by the host device, a writing speed mode; c) send the data-to-be-written from the host device to the flash memory storage device; and d) send an external command from the host device to the flash memory storage device to store the sent data in the flash memory storage device using the selected writing speed mode.

One embodiment is a method of writing data into a flash memory storage device having a plurality of flash memory dies. The method comprises: a) receiving incoming data, by the flash memory storage device, from a source external to the storage device; b) determining an extent to which a die of the flash memory storage device is full of previously stored data; c) in accordance at least in part with the determined extent, selecting a bits-per-cell density mode; and d) in response to the receiving of the incoming data, storing the received incoming data in the flash memory storage device using the selected bits-per-cell density mode.

According to some embodiments, the method is carried out without, before the storing of step (d), storing the incoming data in the flash memory storage device using a bits-per-cell density mode other than the selected bits-per-cell density mode.

According to some embodiments, the selecting is carried out in response to the receiving of the data of step (a).

According to some embodiments, the selecting is carried out before the receiving of the data of step (a).

One embodiment is a method of writing data into a flash memory storage device having a plurality of flash memory dies. The method comprises: a) receiving incoming data, by the flash memory storage device, from a source external to the storage device; b) determining an extent to which a die of the flash memory storage device is full of previously stored data; c) in accordance at least in part with the determined extent, selecting a writing speed mode; and d) in response to the receiving of the incoming data, storing the received incoming data in the flash memory storage device using the selected writing speed mode.

One embodiment is a method of writing data into a flash memory storage device having a plurality of flash memory dies by a host device coupled to the flash memory storage device. The method comprises: a) determining, by the host device, an extent to which a die of the flash memory storage device is full of previously stored data; b) in accordance at least in part with the determined extent, selecting, by the host device, a bits-per-cell density mode; c) sending the data to-be-written from the host device to the flash memory storage device; and d) sending an external command from the host device to the flash memory storage device to store the sent data in the flash memory storage device using the selected bits-per-cell density mode.

One embodiment is a flash memory device comprising: a) a device interface for coupling with a host device; b) a flash memory including a plurality of flash memory dies; and c) a flash controller operative to: i) receive incoming data from the host device via the device interface; ii) determine an extent to which a die of the flash memory is full of previously stored data; iii) in accordance at least in part with the determined extent select a bits-per-cell density mode; and iv) in response to the receiving of the incoming data of (i), store the received incoming data in the flash memory using the selected bits-per-flash-cell density mode.

According to some embodiments, the flash controller is operative to carry out steps (i)-(iv) without, before the carrying out of step (iv), storing the data in the flash memory storage device using a bits-per-cell density mode other than the selected bits-per-cell density mode.

According to some embodiments, the flash controller is operative to carry out the selecting in response to the receiving of the data of step (i).

According to some embodiments, the flash controller is operative to carry out the selecting before the receiving of the data of step (i).

One embodiment is a flash memory device comprising: a) a device interface for coupling with a host device; b) a flash memory including a plurality of flash memory dies; and c) a flash controller operative to: i) receive incoming data from the host device via the device interface; ii) determine an extent to which a die of the flash memory is full of previously stored data; iii) in accordance at least in part with the determined extent, select a writing speed mode; and iv) in response to the receiving of the incoming data of (i), store the received incoming data in the flash memory using the selected writing speed mode.

According to some embodiments, the flash controller is operative to carry out steps (i)-(iv) without before the carrying out of step (iv), storing the data in the flash memory storage device using a writing speed mode other than the selected writing speed mode.

According to some embodiments, the flash controller is operative to carry out the selecting in response to the receiving of the data of step (i).

According to some embodiments, the flash controller is operative to carry out the selecting before the receiving of the data of step (i).

One embodiment is a method of writing data into a flash memory storage device having a plurality of dies by a host device coupled to the flash memory storage device. The method comprises: a) determining, by the host device, an extent to which a die of the flash memory storage device is full of previously stored data; b) in accordance at least in part with the determined extent, selecting, by the host device, a writing speed mode; c) sending the data-to-be-written from the host device to the flash memory storage device; and d) sending an external command from the host device to the flash memory storage device to store the sent data in the flash memory storage device using the selected writing speed mode.

One embodiment is a method of writing data into a flash memory storage device having a plurality of dies by a host device coupled to the flash memory storage device. The method comprises: a) determining, by the host device, an extent to which a die of the flash memory storage device is full of previously stored data; b) in accordance at least in part with the determined extent, selecting, by the host device, a bits-per-cell density mode; c) sending the data-to-be-written from the host device to the flash memory storage device; and d) sending an external command from the host device to the flash memory storage device to store the sent data in the flash memory storage device using the selected bits-per-cell density mode.

One embodiment is a host device comprising: a) a host-side storage for storing data; b) a host-side processor; c) a host-side interface for coupling with a flash memory device having a plurality of flash dies; and d) driver code residing in the host-side storage, wherein execution of the driver code by the host-side processor is operative to: i) determine an extent to which a die of the coupled flash memory storage device is full of previously stored data; ii) in accordance at least in part with the determined extent, select a bits-per-cell density mode; iii) send data-to-be-stored to the coupled flash memory device via the host-side interface; and iv) send an external command via the host-side interface to the flash memory storage device to store the sent data in the flash memory storage device using the selected bits-per-cell density mode.

One embodiment is a host device comprising: a) a host-side storage for storing data; b) a host-side processor; c) a host-side interface for coupling with a flash memory device having a plurality of dies; and d) driver code residing in the host-side storage, wherein execution of the driver code by the host-side processor is operative to i) determine an extent to which a die of the coupled flash memory storage device is full of previously stored data; ii) in accordance at least in part with the determined extent, select a writing speed mode; iii) send data-to-be-stored to the coupled flash memory device via the host-side interface; and iv) send an external command via the host-side interface to the flash memory storage device to store the sent data in the flash memory storage device using the selected writing speed mode.

One embodiment is a computer readable medium having stored thereon computer readable program code for writing data into a flash memory storage device having a plurality of flash dies. The program code is operable to: a) receive incoming data, by the flash memory storage device, from a source external to the storage device; b) determine an extent to which a die of the flash memory storage device is full of previously stored data; c) in accordance at least in part with the determined extent, select a bits-per-cell density mode; and d) in response to the receiving of the incoming data, store the received incoming data in the flash memory storage device using the selected bits-per-cell density mode.

One embodiment is a computer readable medium having stored thereon computer readable program code for writing data into a flash memory storage device having a plurality of flash dies. The program code is operable to: a) receive incoming data, by the flash memory storage device, from a source external to the storage device; b) determine an extent to which a die of the flash memory storage device is full of previously stored data; c) in accordance at least in part with the determined extent, select a writing speed mode; and d) in response to the receiving of the incoming data, store the received incoming data in the flash memory storage device using the selected writing speed mode.

One embodiment is a computer readable medium having stored thereon computer readable program code for writing data into a flash memory storage device by a host device coupled to the flash memory storage device having a plurality of flash dies. The program code is operable, upon execution by the host device, to cause the host device to: a) determine an extent to which a die of the flash memory storage device is full of previously stored data; b) in accordance at least in part with the determined extent select a bits-per-cell density mode; c) send the data-to-be-written from the host device to the flash memory storage device; and d) send an external command to the flash memory storage device to store the sent data in the flash memory storage device using the selected bits-per-cell density mode.

One embodiment is a computer readable medium having stored thereon computer readable program code for writing data into a flash memory storage device having a plurality of flash dies by a host device coupled to the flash memory storage device. The program code is operable, upon execution by the host device, to cause the host device to: a) determine, by the host device, an extent to which a die of the flash memory storage device is full of previously stored data; b) in accordance at least in part with the determined extent, select, by the host device, a writing speed mode; c) send the data-to-be-written from the host device to the flash memory storage device; and d) send an external command from the host device to the flash memory storage device to store the sent data in the flash memory storage device using the selected writing speed mode.

It is noted that features described above as pertaining to certain embodiments may also be included in other embodiments, unless indicated to the contrary herein below.

DETAILED DESCRIPTION OF EMBODIMENTS

The claims below will be better understood by referring to the present detailed description of example embodiments with reference to the figures. The description, embodiments and figures are not to be taken as limiting the scope of the claims. It should be understood that not every feature of the presently disclosed methods, apparatuses, and computer readable media having stored thereon computer code for writing data to a flash in a mode determined in accordance with an extent that the flash is full of previously stored data is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e. meaning "must").

Figure 1A:
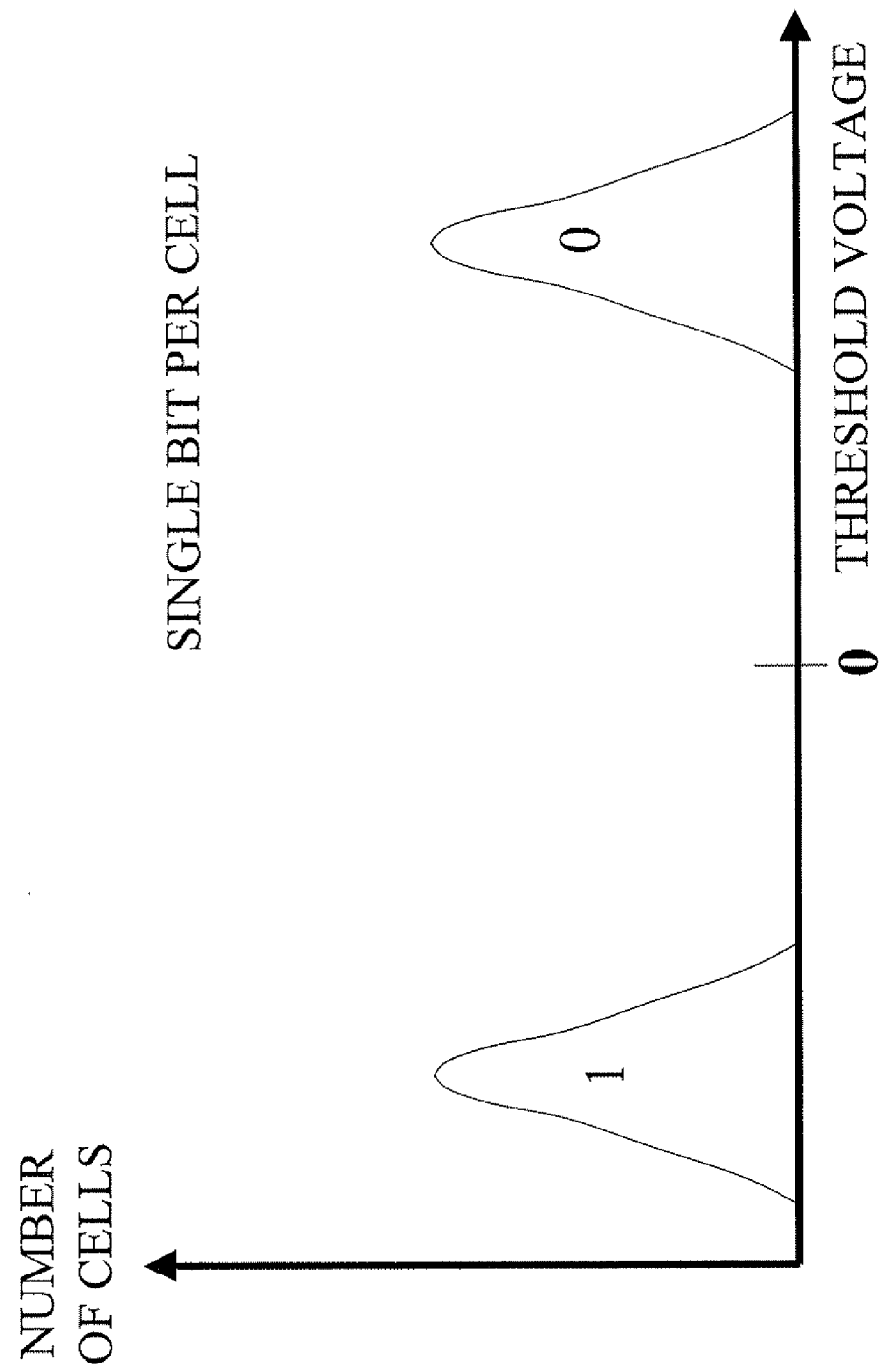
FIGS. 1A-1B are a graphical illustration of distributions of thresholds voltages of a large population of memory cells (prior art).
Figure 1B:
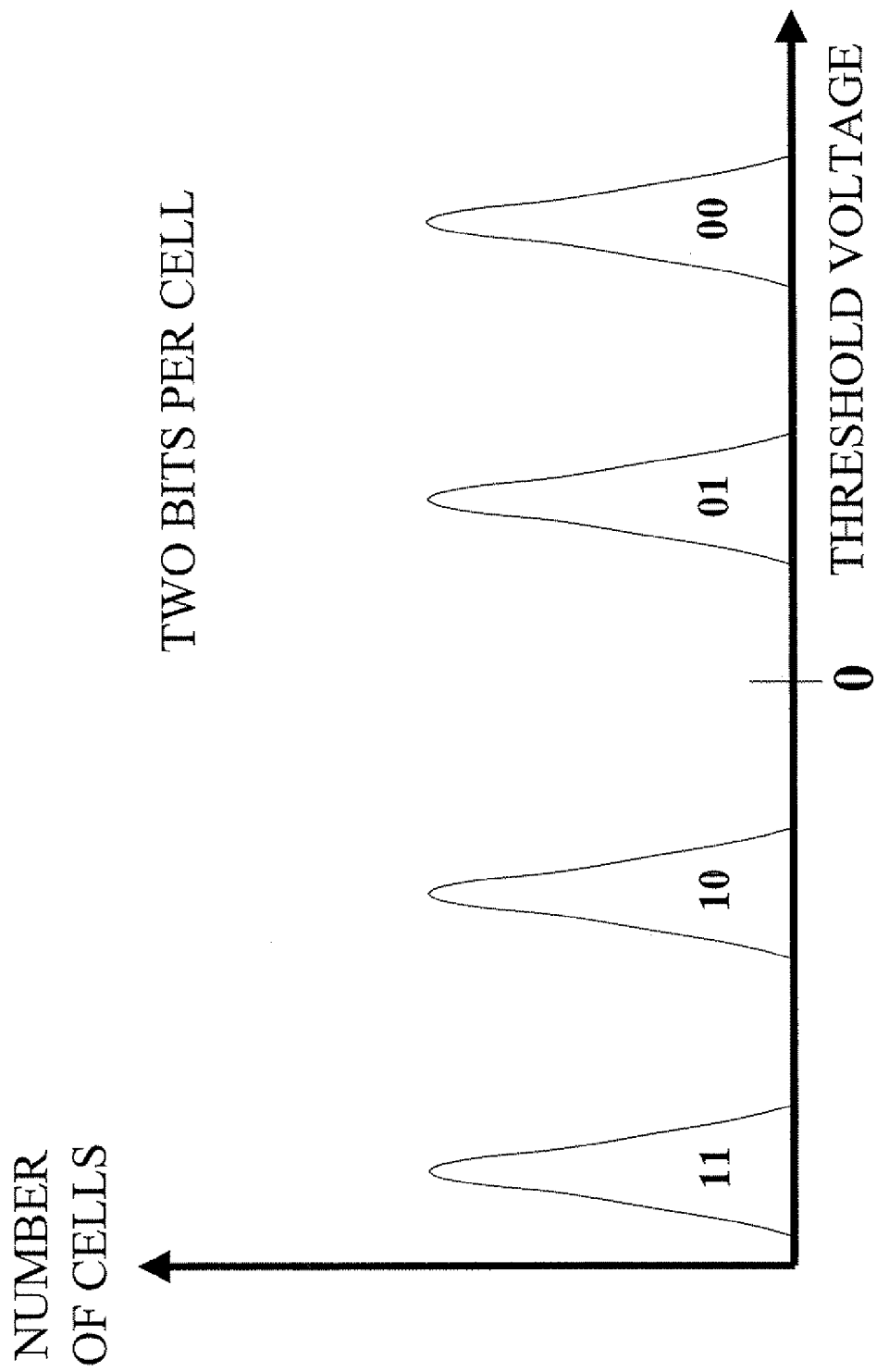
Figure 1C:
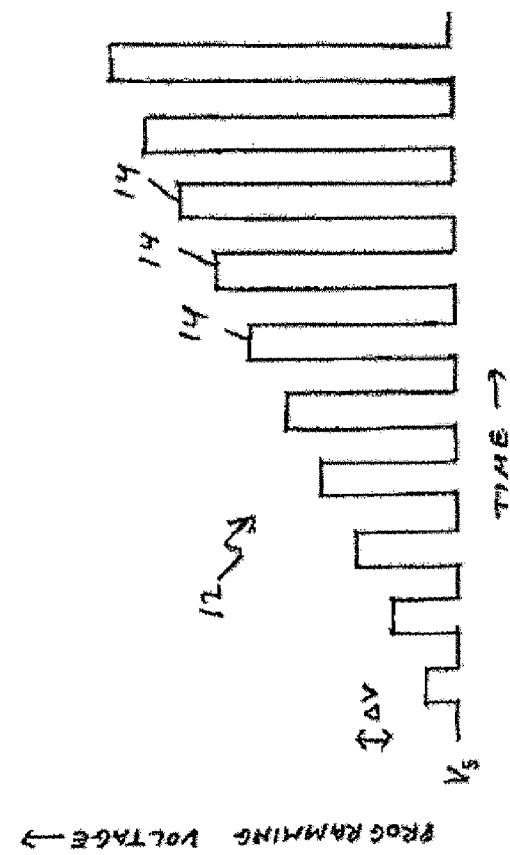
FIG. 1C shows the distribution of threshold voltages of a two-level EPROM cell according to the prior art.
Figure 1D:
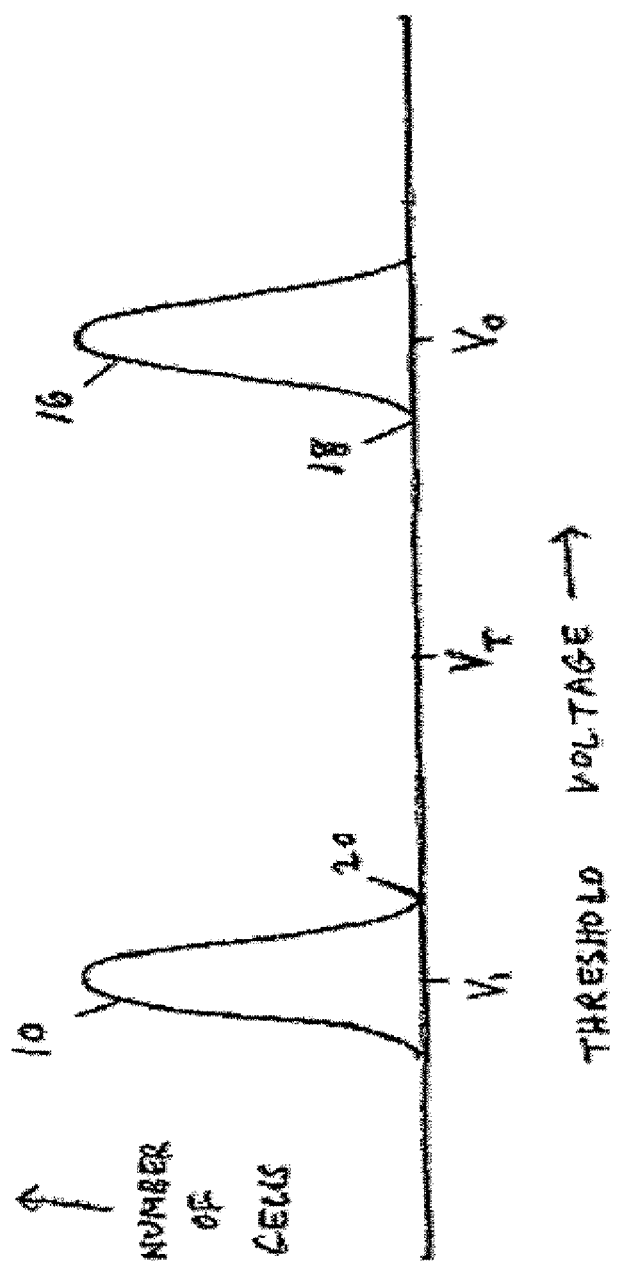
FIG. 1D shows the programming pulse train of an EPROM cell according to the prior art.
Figure 1E:
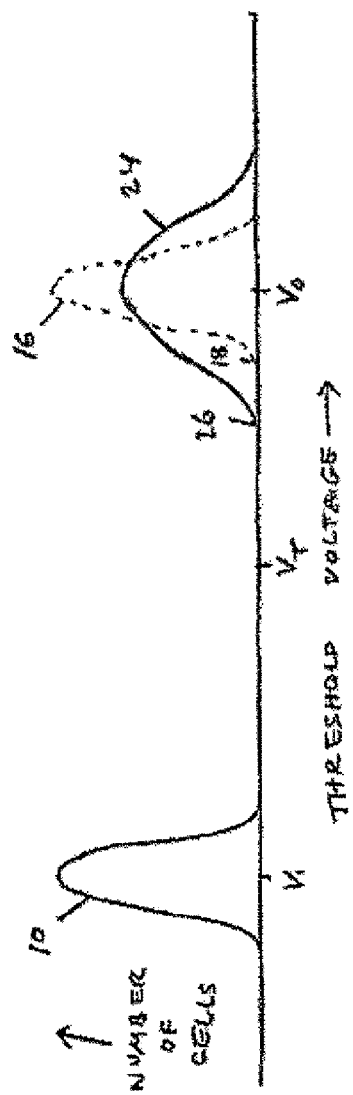
FIG. 1E shows the distribution of threshold voltages of a two-level EPROM cell programmed using a larger programming voltage increment and/or wider programming pulses than in the prior art than in FIG. 1D (prior art).
Figure 1F:
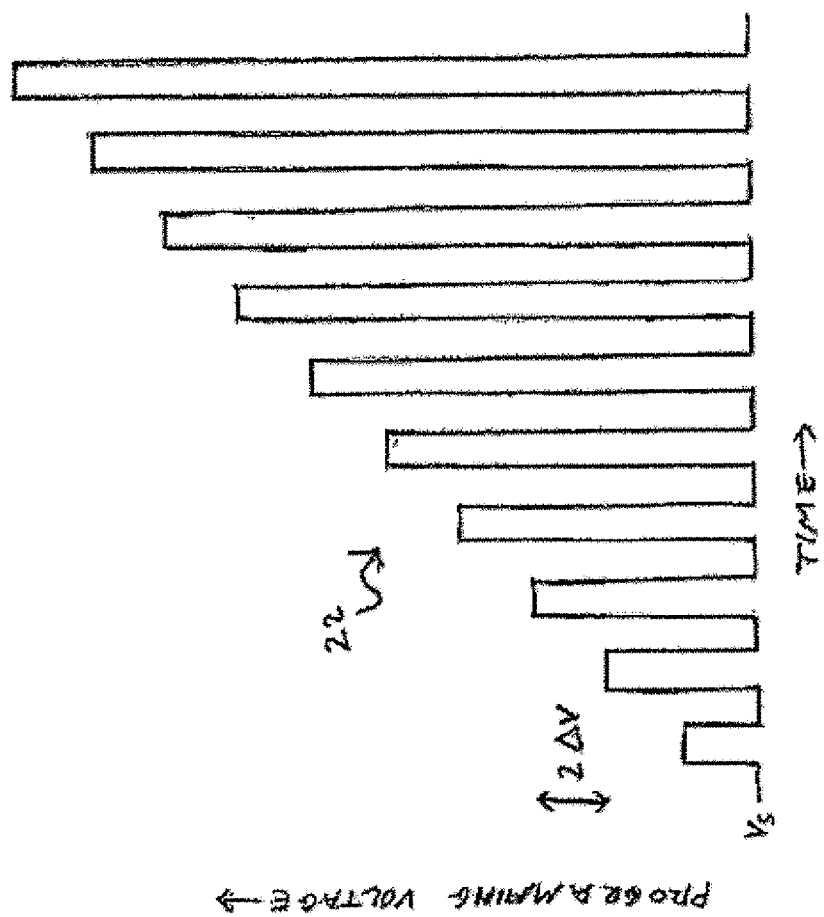
FIG. 1F shows programming pulse trains used to program the upper threshold voltage of FIG. 1E (prior art).
Figure 2A:
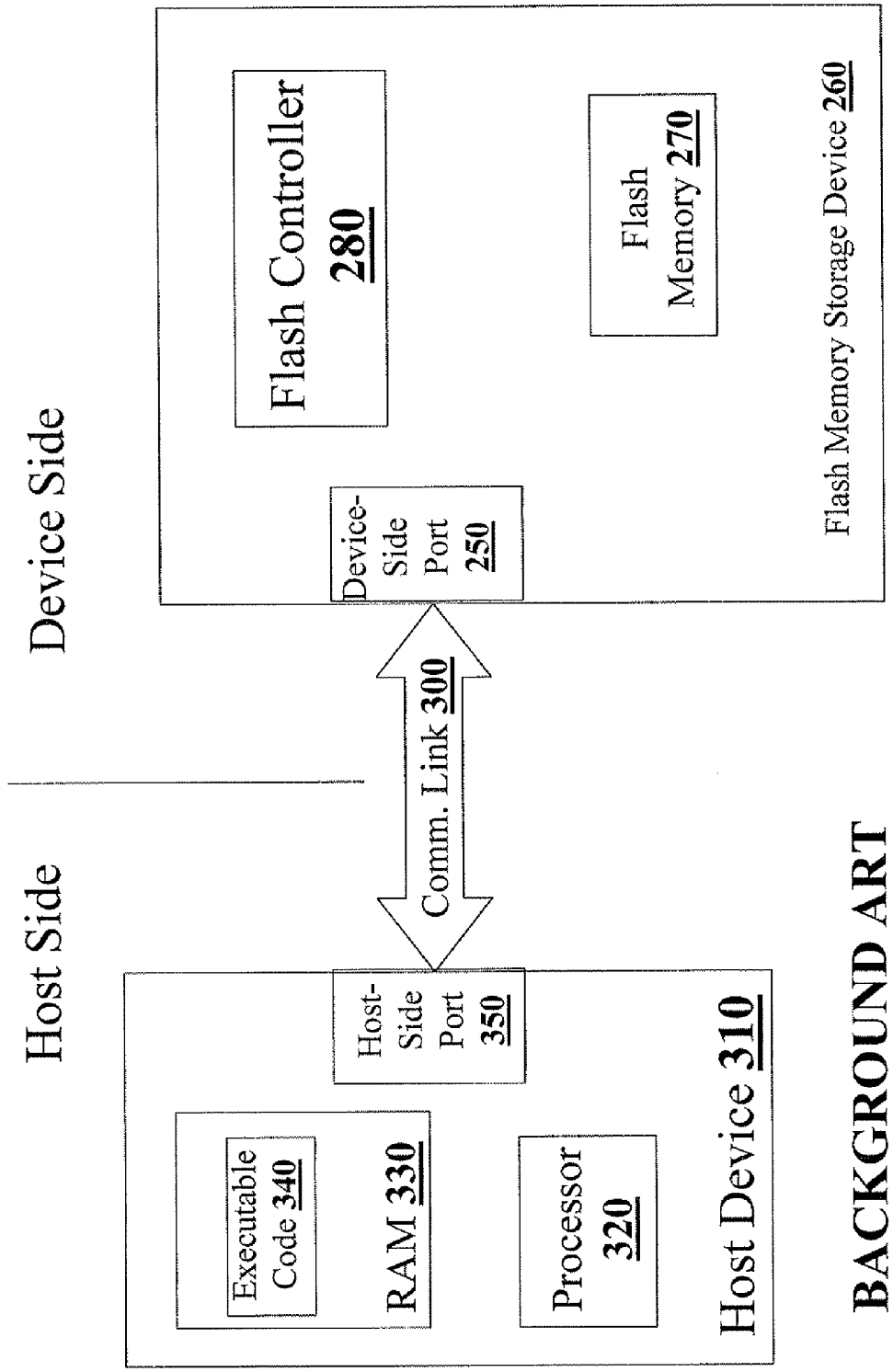
FIG. 2A is a block diagram of an exemplary system including a host device and a flash memory device (prior art).
Figure 2B:
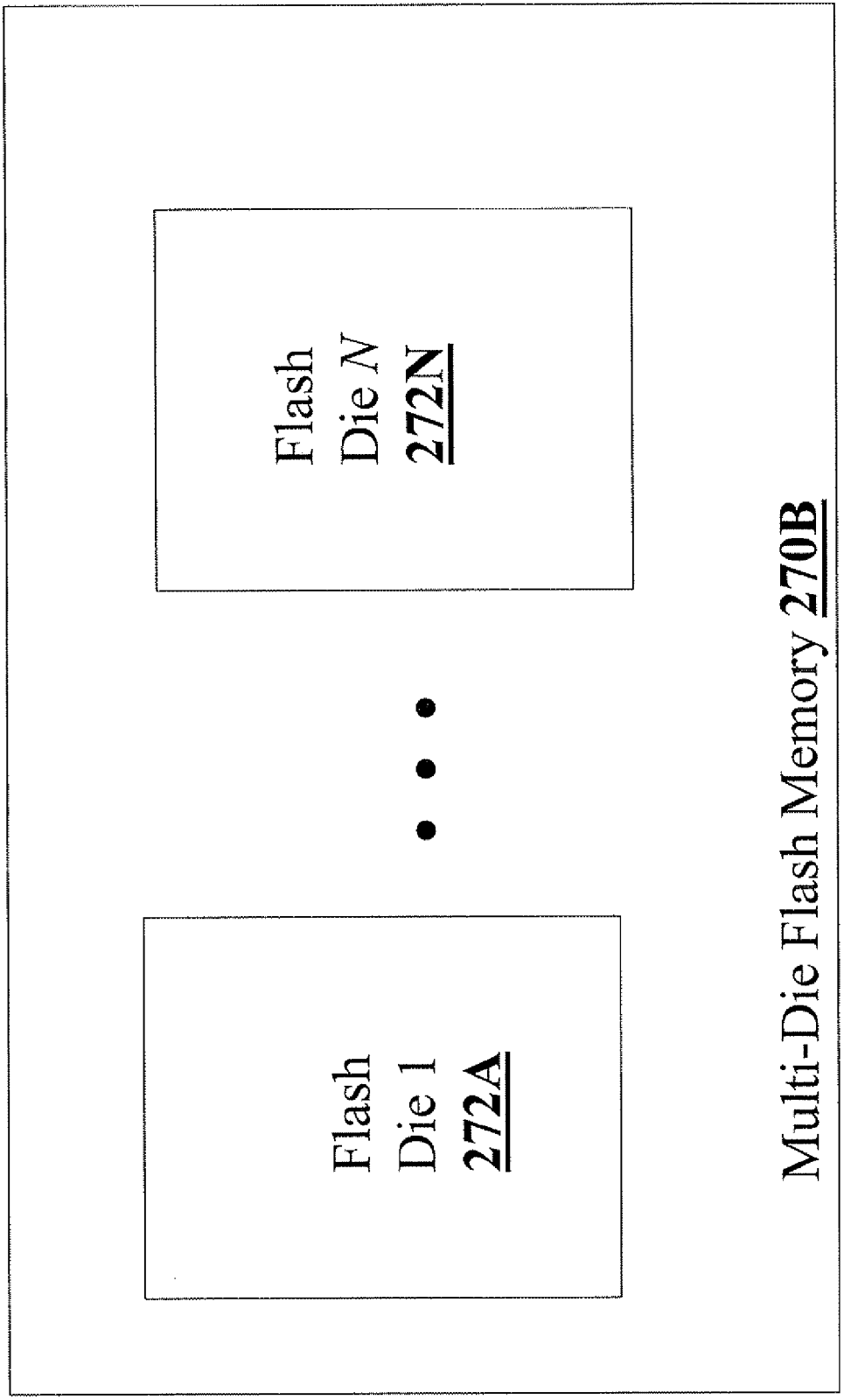
FIG. 2B (prior art) is a block diagram of a multi-die flash memory that includes a plurality of flash dies
Figure 3:
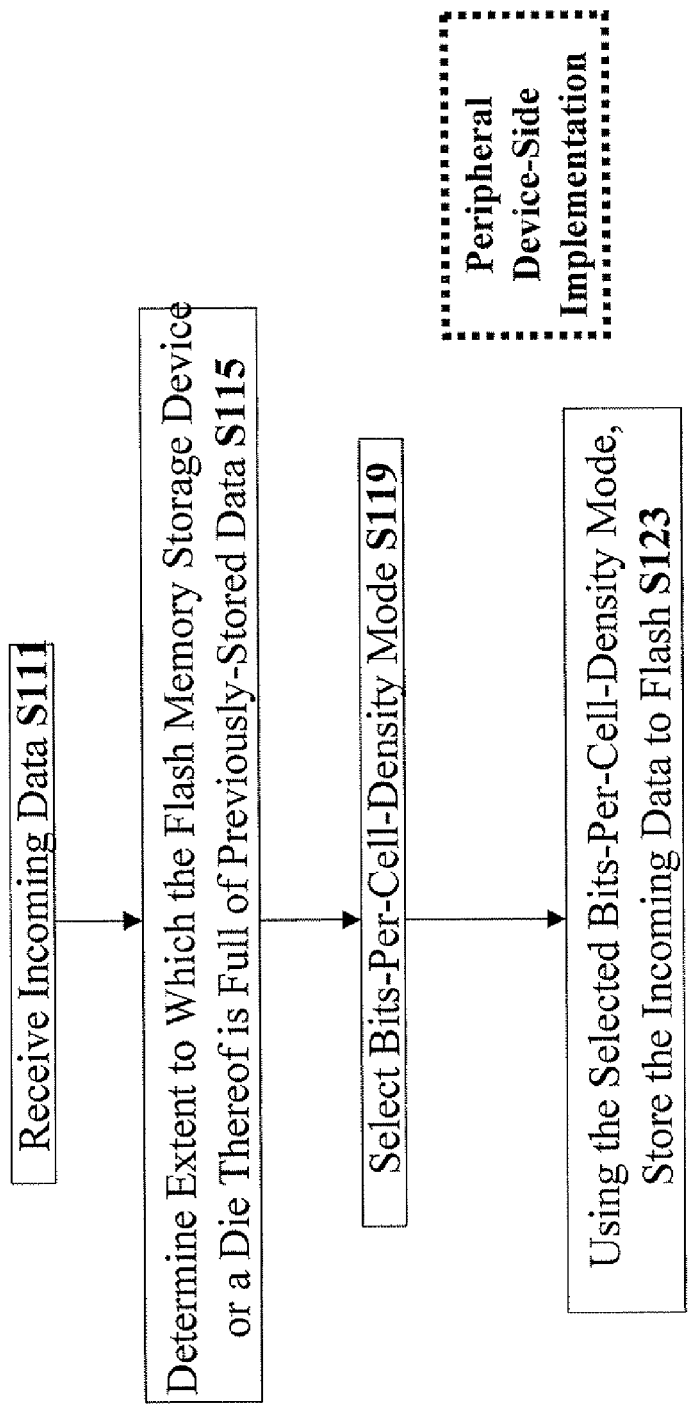
FIGS. 3, 6, 7, 9, 10 are flowcharts of an exemplary routine for writing data into a flash memory using a bits-per-cell density mode selected in accordance with an extent to which the flash memory storage device is full of previously-stored data.
Figure 4:
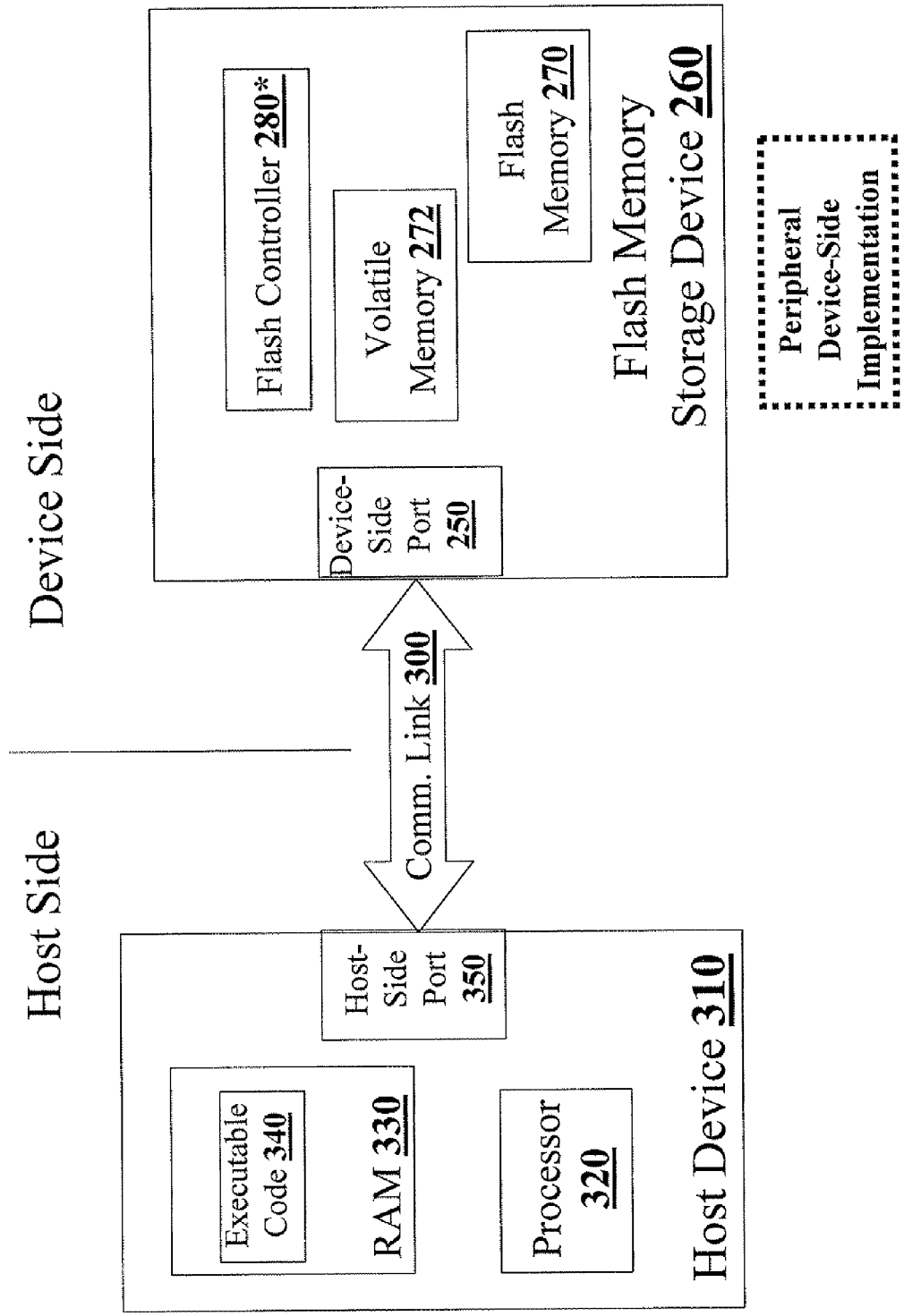
FIG. 4 is a block diagram of an exemplary system including a host device and a flash memory device where the flash memory device is operative to carry out the technique of any of FIGS. 3, 6, 10 and 12.

Reference is now made to FIGS. 3-4. FIG. 3 is a flowchart of an exemplary routine for writing data into a flash memory. In some embodiments, one or m-ore steps of the routine of FIG. 3 are carried out by flash controller 280* in the system of FIG. 4.

In step S111, incoming data is received into flash device 260. In one example, the data is received by flash device 260 from host device 310 via ports 250 and 350. In step S115, an extent to which the flash memory storage device 260 (or a die thereof—i.e. a die of a multiple die flash memory device) is full of previously-stored data is determined.

In step S119, a bits-per-cell density mode is selected in accordance with the extent to which the flash memory storage device 260 is full of previously-stored data. For example, in the event that the flash memory storage device 260 (or a die thereof) is relatively "full" of previously-stored data, it may be decided, in step S119, to select a relatively "high" a bits-per-cell density mode (i.e. storing a greater number of bits per cell) in order to "conserve" flash memory cells. This relatively high bits-per-cell density mode may be selected despite the relative slower write speed and/or relatively lower reliability compared with a mode that stores fewer bits per cell.

Conversely, in the event that this is not the case, and that flash memory storage device 260 is relatively "devoid" of previously-stored data, it may be decided that there is less of a need to "conserve" flash memory cells within the flash memory device or a particular die. In this case, it may be decided to select a relatively "lower" a bits-per-cell density (i.e. storing fewer bits per cell) mode, in order to benefit from a faster write speed and/or greater reliability.

In one non-limiting use case, it is decided in step S115 that: (i) if fewer than 20% of the flash cells of flash memory 270 are used to store previously-stored data, then a "one-bit-per-cell density mode" will be used to store incoming data (i.e. to configure the flash cell(s) on which the incoming data is to be stored as a single bit cell); (ii) if more than 20% but fewer than 40% of the flash cells of flash memory 270 are used to store previously-stored data, then a "two-bits-per-cell density mode" will be used to store incoming data; (iii) if greater than 40% of the flash cells of flash memory 270 are used to store previously-stored data, then a "three-bits-per-cell density mode" will be used to store incoming data.

In step S123, the incoming data is stored to flash memory 270 using the selected bits-per-cell density mode.

It is noted that, unless specified otherwise, there is no limitation on the order of the steps of the routine of FIG. 3 or in any other routine described herein. In some embodiments, the steps are performed in the order specified in the figure. In some embodiments, step S115 and optionally step S119 are performed before step S111.

In some embodiments, the selecting of the bits-per-cell density mode S119 and/or the storing of step S123 of the incoming data are carried out in response to the actual receiving of the incoming data in step S111. In one example, the selecting of the bits-per-cell density mode of step S119 is carried out in accordance with both (i) the extent to which the flash memory storage device is full of previously-stored data; and (ii) the quantity of incoming data received in step S111. Of course it is appreciated that this is not a requirement, and at a minimum, the selecting of step S119 is carried out according to the extent to which the flash memory storage device is full of previously-stored data. Furthermore, it is appreciated that the selecting of step S119 may be carried out in accordance with any other factor(s).

Furthermore, it is noted that the technique of FIG. 3, in some embodiments, relates to the case where step S123 is the "first flash storing" within flash memory storage device. In these embodiments, when the data is received in step S111 into the flash device 260, the data is initially stored in volatile memory 272, and subsequently stored in flash memory 270. In these embodiments, the data is not "flash-stored" in some "initial" bits-per-memory mode—i.e. after the receiving of step S111 and before the storing of step S123). Instead, during this time period, the data resides in volatile memory 272. The first time the data (i.e. which is received in step S111) is stored into flash is in step S123, using the selected bits-per-cell density mode.

It is noted that flash controller 280 or 280* may be implemented using any combination of hardware (for example, including a microprocessor and optionally volatile memory such as RAM or registers), firmware and/or software (for example, computer code which is stored in volatile and/or non-volatile memory and is executable by a microprocessor). Flash controller 280 or 280* may include any software and/or firmware and/or hardware element(s) including but not limited to field programmable logic array (FPLA) element(s), field programmable gate array (FPGA) element(s), and application-specific integrated circuit (ASIC) element(s). Any instruction set architecture may be used in flash controller 280 or 280* including but not limited to reduced instruction set computer (RISC) element(s) and/or complex instruction set computer (CISC).

DEFINITIONS

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

"Incoming data" refers to data received by a flash memory device from a host that has not yet been stored in flash memory of the flash memory device. "Incoming data" may be temporarily stored (for example, by flash controller 280*) in volatile memory 270 within the flash memory device.

In some embodiments, an "extent to which the flash memory storage device (or a die thereof) is full of previously-stored data" is determined. "Previously-stored data" refers to data stored in flash memory of the flash device before the time at which the "extent to which the flash memory storage device is full of previously-stored data" is determined.

The phrase "flash memory storage device (or a die thereof) is full of previously-stored data" refers to one or more of: (i) previously-stored data that is also currently stored has not been physically erased, and still logically valid and/or (ii) previously-stored data that is still physically present on the device (or a die thereof but is no longer logically valid (i.e. data that has been 'erased' according to one or more storage system data structure(s)). One example of the latter case is data for which the process of erasing has 'begun' (because the storage data structure(s) have been updated to indicate to indicate that the physical or logical location of this previously-stored data is now 'free') but for which there has not been enough time and/or resources to physically erase this logically-erased data yet.

Thus, the phrase "flash memory storage device (or a die thereof) is full of previously-stored data" refers either to "logically valid data" or to "any physically existing data, whether valid or not" or to any combination of the two.

The phrase "flash memory storage device (or a die thereof) is full of previously-stored data" refers to data stored in flash memory 270 and not to data stored in volatile memory 272.

The phrase "flash memory storage device (or a die thereof) is full of previously-stored data" refers to some metric of: (i) the amount of data previously stored; and/or (ii) the number of flash memory cells previously designated as "full" with stored data. This may be an absolute metric (for example, in units of megabytes or gigabytes and/or in units of "full" flash cells or blocks or pages) or may be a relative metric (for example, a percentage of the total data capacity—for example, in megabytes of gigabytes—of the flash memory or a percentage of the total number of flash cells or blocks or pages.

Exemplary metrics of an "extent to which the flash memory storage device (or a die thereof) is full of previously-stored data" include but are not limited to i) a fraction of the storage device (i.e. the flash memory 270 of the storage device) that is full of the previously stored data; ii) an absolute amount of previously-stored data stored in the storage device (i.e. the flash memory 270 of the storage device); and iii) an amount of free space on the storage device (i.e. the flash memory 270 of the storage device).

In one example, the "determining of the extent to which the flash memory storage device (or a die thereof) is full of previously-stored data" is carried out by reading at least a portion of at least one storage system data structure(s) (NOT SHOWN IN THE FIGS) and/or indication thereof.

In some embodiments, the "determining of the extent to which the flash memory storage device (or a die thereof) is full of previously-stored data" is carried out by flash controller 280*. Alternatively or additionally, the "determining of the extent to which the flash memory storage device is full of previously-stored data" may be carried out by the host device 310 or by any other hardware and/or software and/or firmware element.

It is appreciated that "determining the extent to which the flash memory storage device (or a die thereof)" does not require effecting an exact determination—only some assessment needs to be made of the actual extent.

Embodiments of the present invention relate to flash memory devices where a plurality of writing modes is available or supported. In some embodiments, it is possible to write data to a multi-level cell that stores up to N bits per cell where N is an integer greater than or equal to 2.

In some embodiments, the "bits-per-cell" density mode refers to a writing mode is where $Bit_{MODE}$ bits are written to each individual flash memory cell(s), where $Bit_{MODE}$ is a positive integer less than or equal to N.

Alternatively, the "bits-per-cell" density mode refers to a writing mode where, on average, $Bit_{MODE}$ bits are written to flash memory cells, where $Bit_{MODE}$ is a positive number that may or may not be an integer. This average may be determined in any manner—for example, over a given time period, for a given amount of data, or over a given plurality of memory cells.

In one particular example, during a "data writing" operation, data is written to 5 flash memory cells A-E. In this example, a 'bits-per-cell' density mode of "2 bits per cell" is employed for cells A and B, and a bits-per-cell density mode of "3 bits per cell" is employed for cells C-E. In this example, the average bits-per-cell density mode is thus 2.6.

In some embodiments, the selecting and/or using of a given bits-per-cell density mode may require specifying how many bits of data are to be stored in any individual cell. Nevertheless, this is not a requirement.

In some embodiments, only the average (or some other metric of central tendency) number of bits needs to be specified. This may be carried out, for example, by flash controller 280* and/or by host device 310.

In some embodiments, a minimum or maximum allowed number of bits per cell, or an average number of bits per cell may be specified (i.e. either an integer or a non-integer). In one example, this specified "aggregate" mode parameter may be associated with a certain time period and/or with specific data and/or with one or more flash memory cells.

Figure 5:
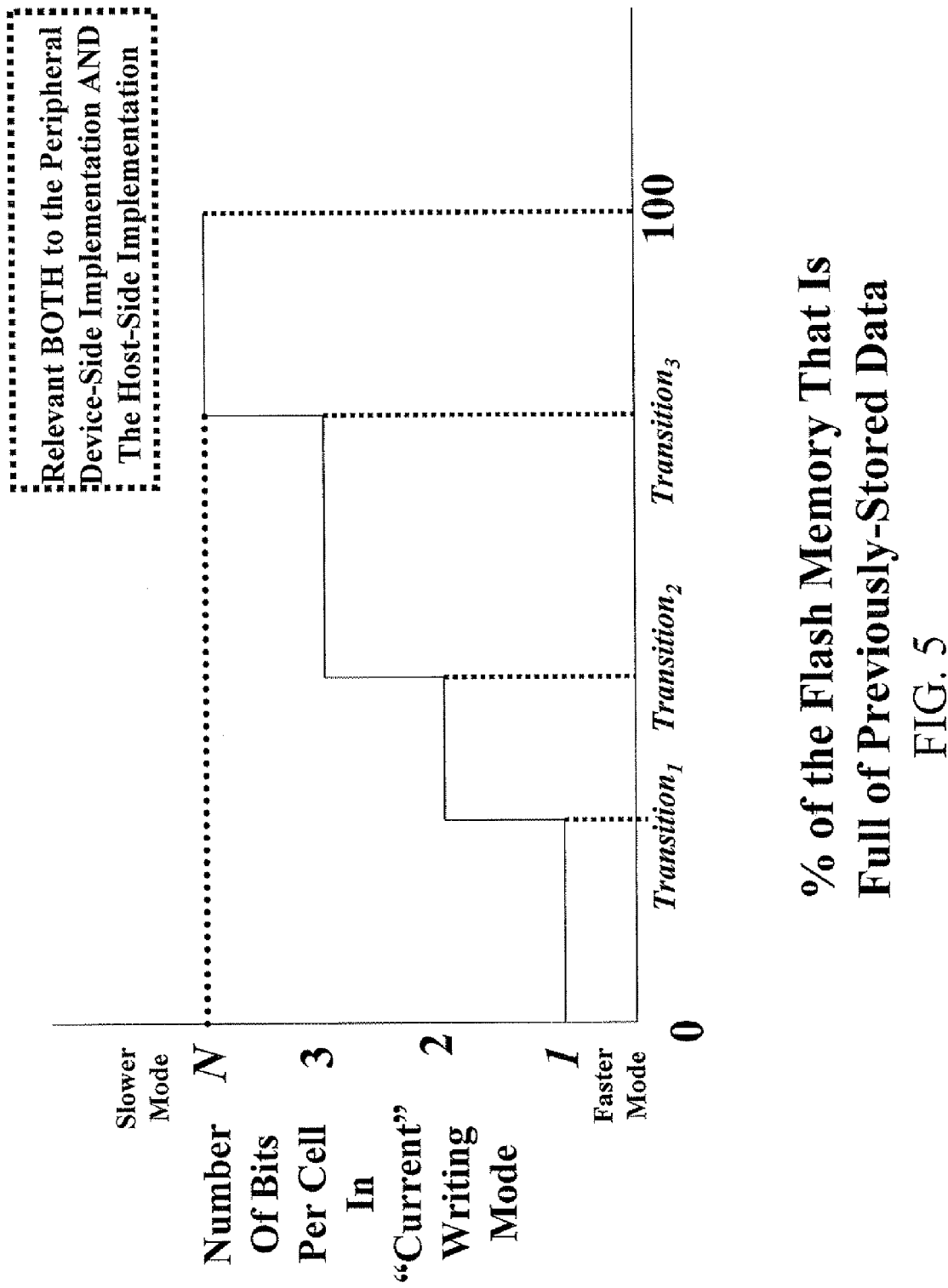
FIG. 5 is a graph describing, in one non-limiting example, a bits-per-cell density mode adopted by a controller and/or employed by a host device as a function of the portion of the flash memory that is full of previously stored data

A Discussion of FIG. 5

FIG. 5 is a graph describing, in one non-limiting examples a bits-per-cell density mode adopted by controller 280 as a function of the portion of the flash memory (or a die thereof) that is full of previously stored data. In the example of FIG. 5, the flash device 260 is able to store up to N bits per flash memory cell, and there are N−1 transition values.

FIG. 5 relates to the specific cases where the bits-per-cell mode is an integer—as noted above, this is not a requirement.

When the quantity of previously stored data increases from a value below a given transition value $Transition_i$ (where i is a positive integer) to a value above the given transition value $Transition_i$ (for example, due to writing extra data to the flash memory), the flash controller 280* changes bits-per-cell density mode from a mode where i bits are stored in each flash cell, to a mode where i+1 bits are stored in each flash cell (i.e. selects a 'higher density' mode).

Similarly, when the quantity of previously stored data decreases from a number above a given transition value $Transition_i$, to a number below the given transition value $Transition_i$ (for example, erasing data to the flash memory either by physically erasing flash memory cells or by updating a storage system table to indicate that a physical and/or logical location is now 'vacant'), the flash controller 280* changes bits-per-cell density mode from a mode where i+1 bits are stored in each flash cell, to a mode where i bits are stored in each flash cell (i.e. selects a 'lower density' mode).

In the example of FIG. 5 the transition values are unevenly spaced. It is appreciate that this is not a limitation, and that in some embodiments, the transition values are evenly spaced. It is also appreciated that the transition values may or may not be pre-determined constants. In some embodiments, one or more transition values are adjusted in accordance with device usage patterns. In one non-limiting example, after the flash memory (or a portion thereof) has been written to a number of times, there is a concern about device endurance. In this example, one or more transition values may be adjusted upwards after a given number of device writes.

FIG. 5 describes the specific case where N>3. This is not a limitation. N may be any integer greater than 1. Furthermore, in the example of FIG. 5 the function shown is monotonic—this is not a limitation. Furthermore, in the example of FIG. 5, the function increases in steps of 1 (or "unit step" increases)—this is not a limitation, and other embodiments with larger steps are contemplated.

In the example of FIG. 5, the x-axis or description of device fullness that is used is a "percentage of the device that is full of previously stored data." As noted earlier, this is just one example of a "device fullness" metric, and other metrics may be used.

Finally, it is noted that the writing mode where there is a greater number of bits per cell is a "slower" writing mode, while the writing mode where there is a smaller number of bits per cell is a "faster" writing mode.

Figure 6:
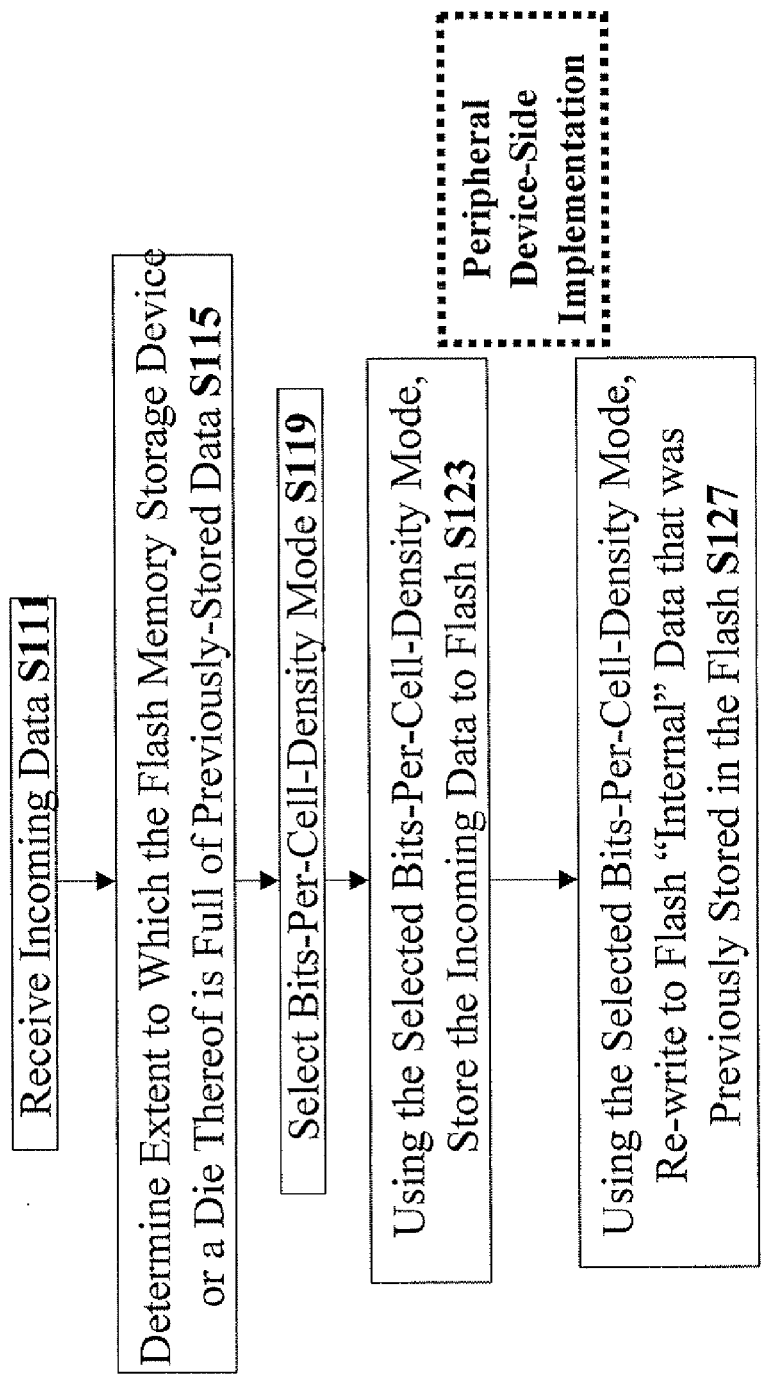

A Discussion of FIG. 6

FIG. 6 is a flowchart of a routine for writing data in a flash device in accordance with some embodiments. The first four steps of the routine of FIG. 6 are identical to the four steps in the routine of FIG. 3.

In the routine of FIG. 6, the selected bits-per-cell density mode is used not only to write the incoming data (in step S123), but is also used to re-write "internal" data that was previously stored in the flash (in step S127).

In some embodiments, step S127 is carried out in response to the receiving of incoming data of step S111. For example, a policy may be enforced such that once the flash memory 270 reaches a minimal threshold "occupancy," it is necessary to handle data in a manner that "conserves" space as much as possible. Thus, according to this policy, the receipt of the incoming data (whose storage to flash 270 would cause the occupancy to exceed a threshold) triggers the enforcement of a "space conservation" policy which concomitantly provides: (i) the feature where "new" or "incoming" data is stored in the flash drive in a "denser" manner so as to "conserve space" in the flash memory 270; (ii) the feature where "old" or "previously stored" data is re-written (in step S127) to the flash drive in a manner that the previously-stored data occupies fewer flash memory cells (i.e. with more bits-per-cell than previously used to stored the 'previously-stored' data). Thus, in this non-limiting example, both steps S123 and S127 facilitate the conservation of space in the flash memory 270.

Thus, in some embodiments, the re-writing of step S127 is carried out in response to the receiving of the additional data.

In a first example, this may be carried out as a "substantially immediate response." Alternatively, in a second example, the re-writing of step S127 may be carried out in a background process—for example, during garbage collection.

Figure 7:
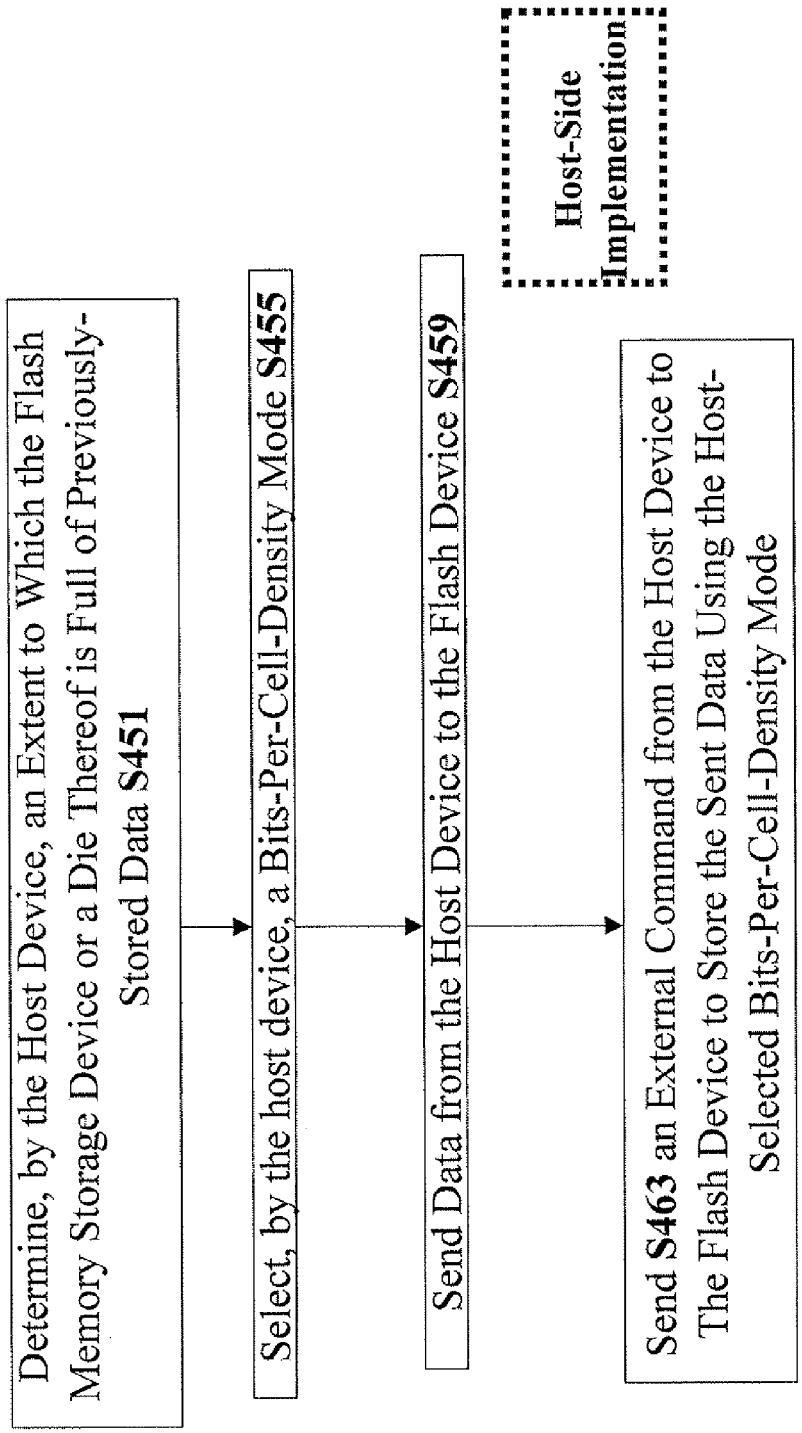
Figure 8:
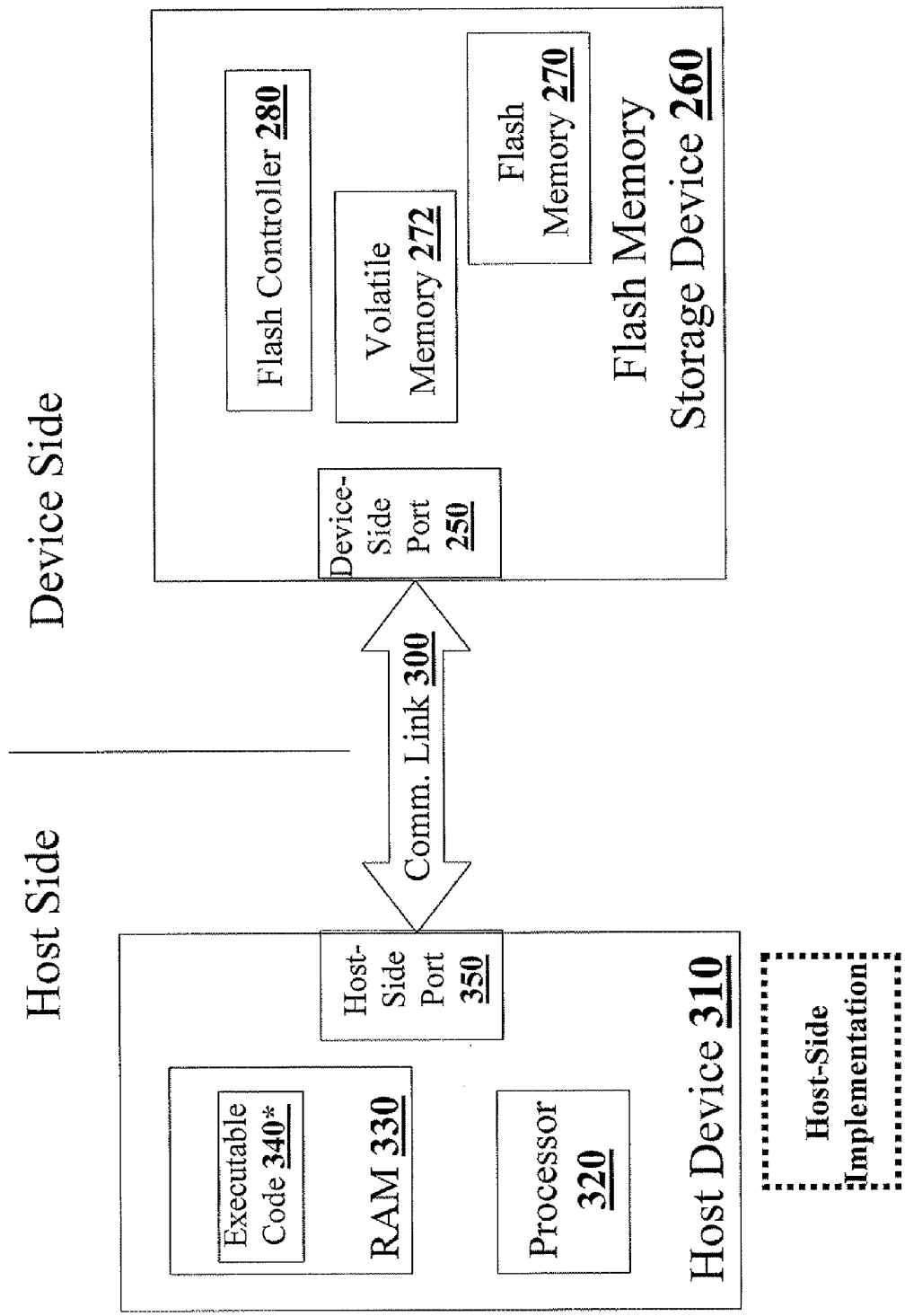
FIG. 8 is a block diagram of an exemplary system including a host device and a flash memory device where the flash memory device is operative to carry out the technique of any of FIGS. 7, 9, 13 and 14.
Figure 9:
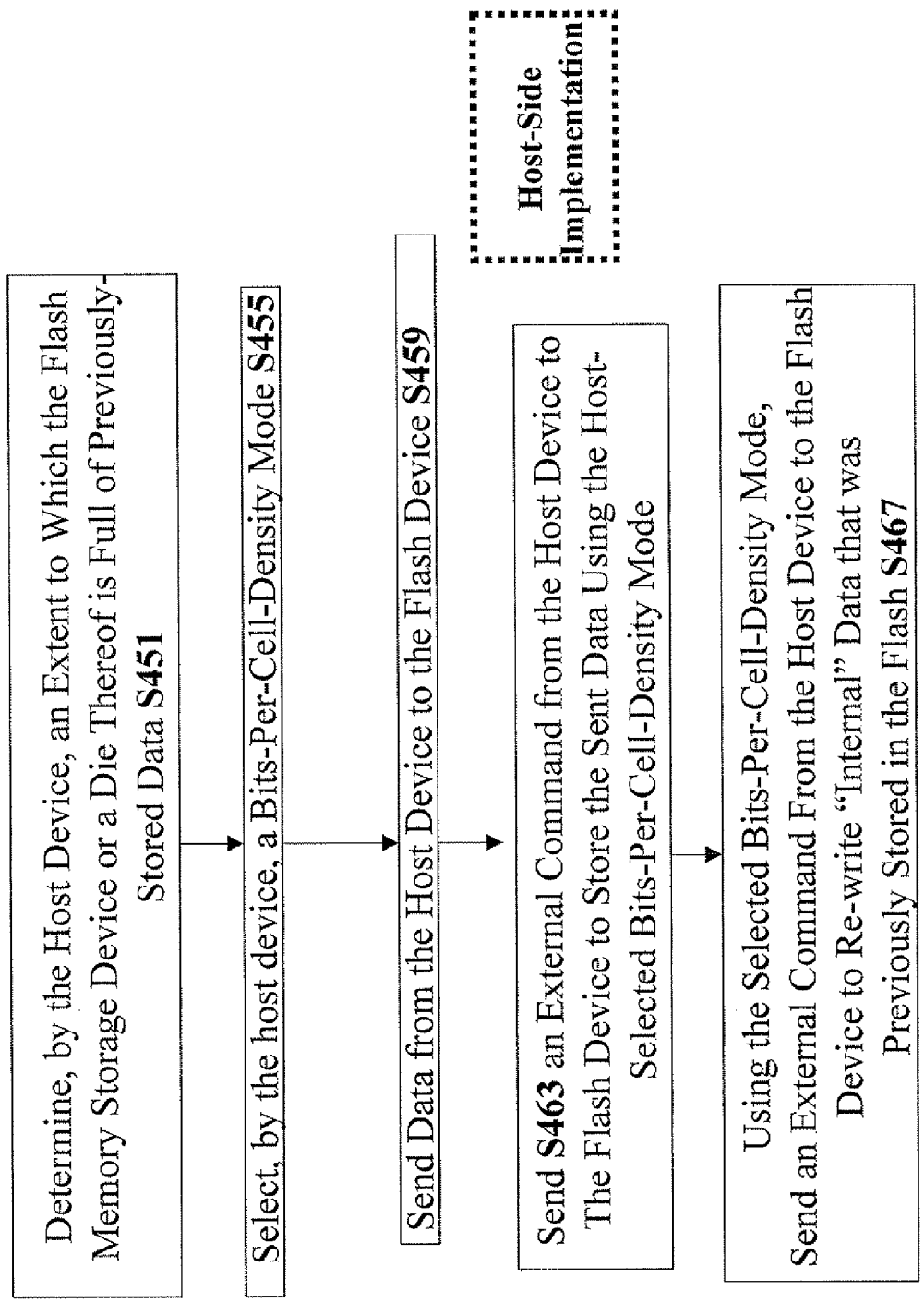

A Discussion of FIGS. 7-9: Host-Side Implementations of a Technique Whereby A Bits-Per-Cell Density Mode Is Selected in Accordance With An Extent to Which the Flash Memory Storage Device is Full of Previously-Stored Data Reference is now made to FIGS. 7-8. FIG. 7 is a flow chart of a routine for writing data into a flash memory storage device 260 by a host device 310. In some embodiments, one or more steps of the technique of FIG. 7 are carried out when processor 320 executes executable code 340 (for example, device driver code) which resides in RAM 330. Other implementations are also contemplated by the present inventor.

In step S451, the host device determines an extent to which the flash memory storage device (i.e. flash memory 270 of flash memory storage device 260) or a die thereof is full of previously-stored data. In some embodiments, the determining of step S451 includes reading at least a portion of one or more storage system data structures (NOT SHOWN) that describe flash memory storage device 260—these one or more storage system data structures may reside at least in part on host device 310, flash memory storage device 260 or in any other location. In some embodiments, the determining of step S451 includes querying the flash memory storage device 260 by the host device 310 via host-side port 350 and device-side port 250.

In step S455, a bits-per-cell density mode is selected by host device 310. The selection of a bits-per-cell density mode is discussed above with reference to step S119 of FIG. 3. In step S459, host device 310 sends data to flash memory storage device 260 via host-side port 350 and device-side port 250. In step S463, host device 310 sends an external command to flash memory storage device 260 (i.e. via host-side port 350 and device-side port 250) to use the host-selected bits-per-cell density mode.

It is noted that the order of steps in FIG. 7 is intended as exemplary and not as limiting. For example, the order of steps S455 and S459 may be reversed—other orders are also contemplated by the present inventor.

Reference is now made to FIG. 9. The first four steps of the routine of FIG. 9 are identical to the four steps in the routine of FIG. 7.

In the routine of FIG. 9, the selected bits-per-cell density mode is used not only to write the incoming data (in step S463), but is also used to re-write "internal" data that was previously stored in the flash (in step S467).

In this respect, the technique of FIG. 9 is similar to the technique of FIG. 6, except that policy enforcement is on the "host side."

A Discussion of FIGS. 10-14

Typically, the more bits that are stored in a given flash cell, the longer it takes to write data to the flash cell. Thus, it is may be said for two positive integers p and q, where q>p, that the q-bits-per-cell density writing mode is relatively "slow" (i.e. compared to the p-bits-per-cell density writing mode) and that the p-bits-per-cell density writing mode is relatively "fast" (i.e. compared to the q-bits-per-cell density writing mode).

Figure 10:
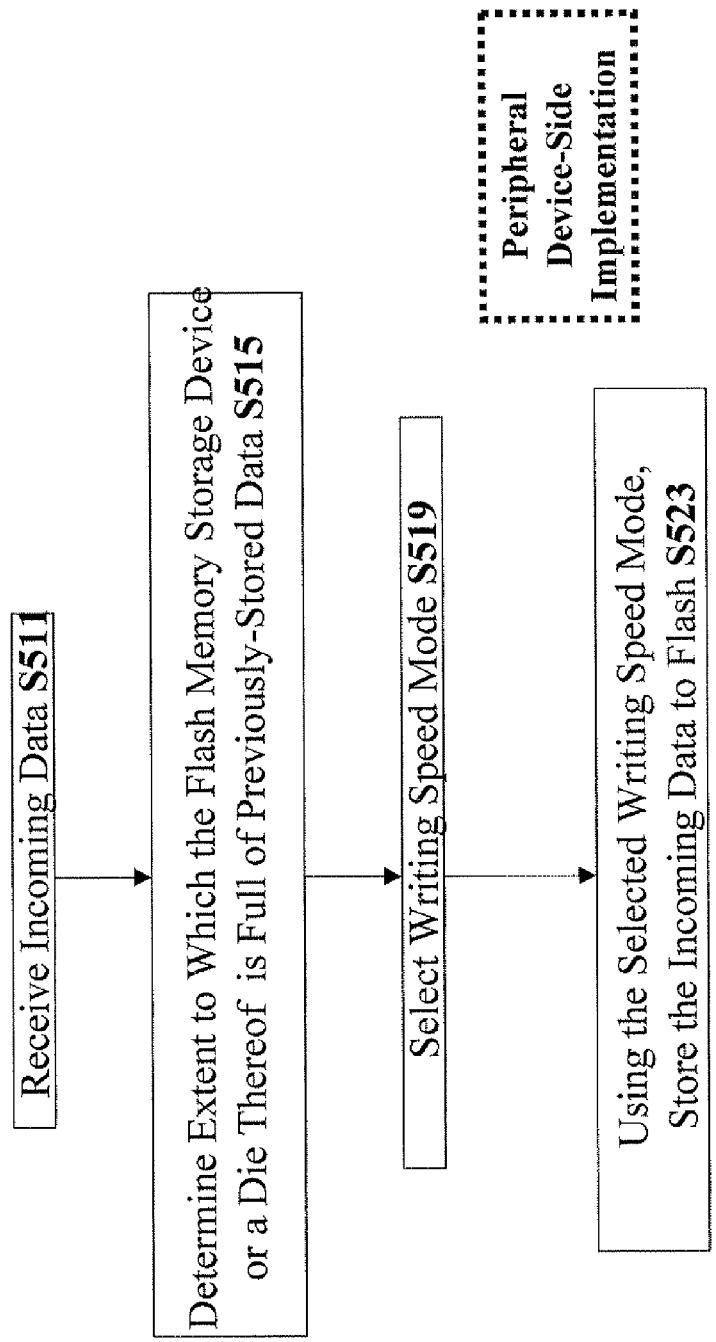

FIG. 10 is a generalization of the technique described in FIG. 3. In FIG. 10, step S511 is analogous to step S111, step S519 is analogous to step S119, and step S523 is analogous to step S123.

The technique of FIG. 3 is a special case of the technique of FIG. 10. Furthermore, it is noted that the number of bits per cell density is not the only "programming parameter" that is related to the speed of flash cell programming or writing. Additional exemplary programming parameters (i.e. programming voltage increment and programming pulse width) that are useful for providing "slow" writing modes and "fast" writing modes were discussed earlier, with reference to FIGS. 1C-1G. Exemplary pulse parameters for providing a slower or faster programming mode include but are not limited to a programming iteration stepping voltage, a maximum programming voltage, a maximum number of iterations per programming operation, a programming base pulse duration and a programming iteration stepping duration. Variation of any of these parameters is useful for determining the "speed" of the "writing mode." The skilled artisan will appreciate that the aforementioned list of programming parameters is just a small number of examples, and is not intended as limiting.

It is noted that step S519 of FIG. 10 is a generalization of step S119 of FIG. 3—i.e. FIG. 3 relates to the special case where "slow mode" vs. "fast mode" is established according to the number of bits per cell.

In exemplary embodiments, the technique of FIG. 3 is carried out by flash controller 280*, as illustrated in FIG. 4.

Figure 11:
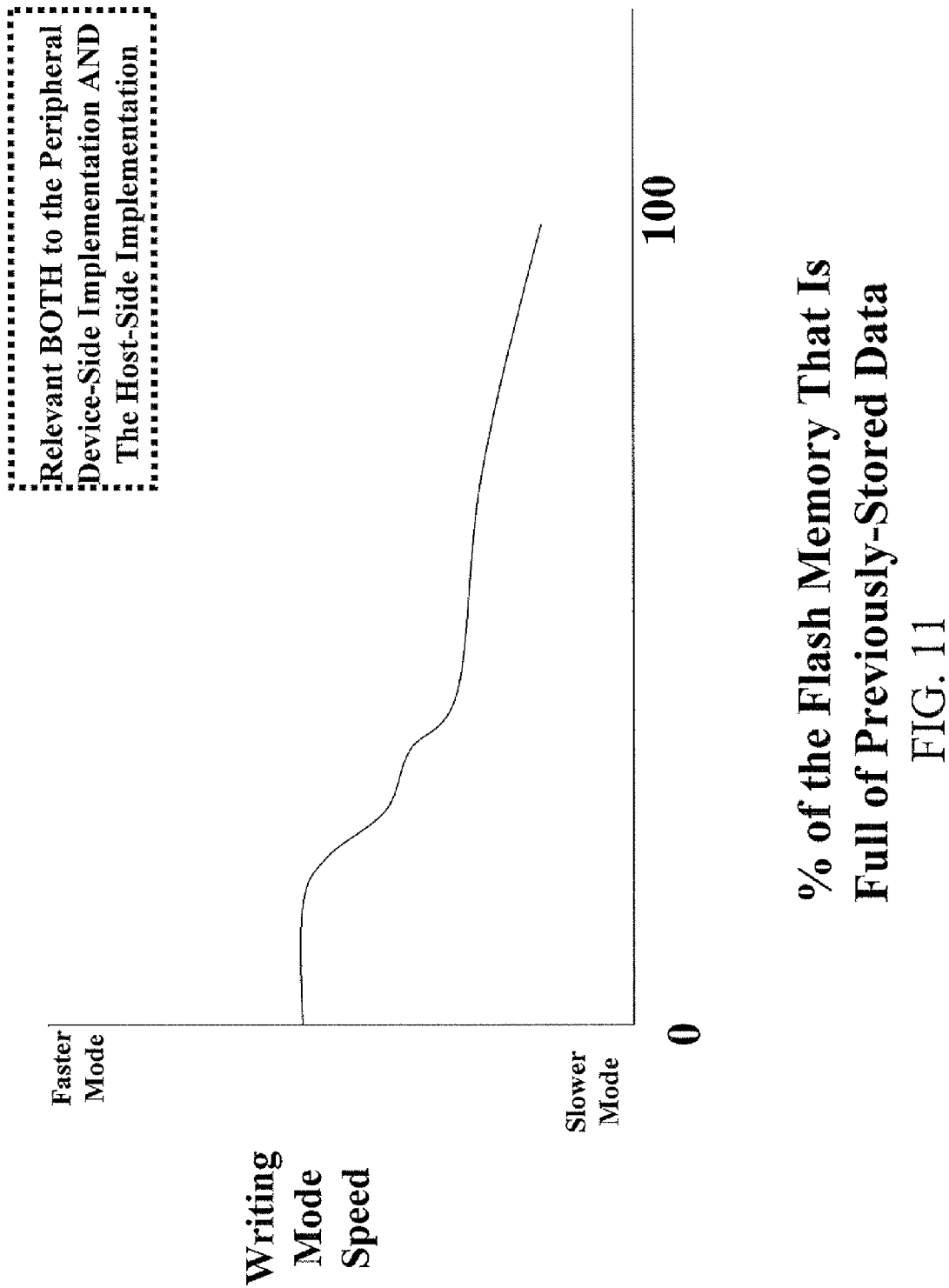
FIG. 11 is a graph describing, in one non-limiting example, a writing speed mode adopted by a controller and/or employed by a host device as a function of the portion of the flash memory that is full of previously stored data

FIG. 11 is a graph describing, in one non-limiting example, a "speed" of a writing mode adopted by controller 280 as a function of the portion of the flash memory (or a die thereof that is full of previously stored data. The skilled artisan will appreciate that the functional form illustrated in FIG. 1I (as well as the monotonically decreasing feature) is merely an example, and any function may be used in the technique of FIG. 10 or subsequent figures.

Figure 12:
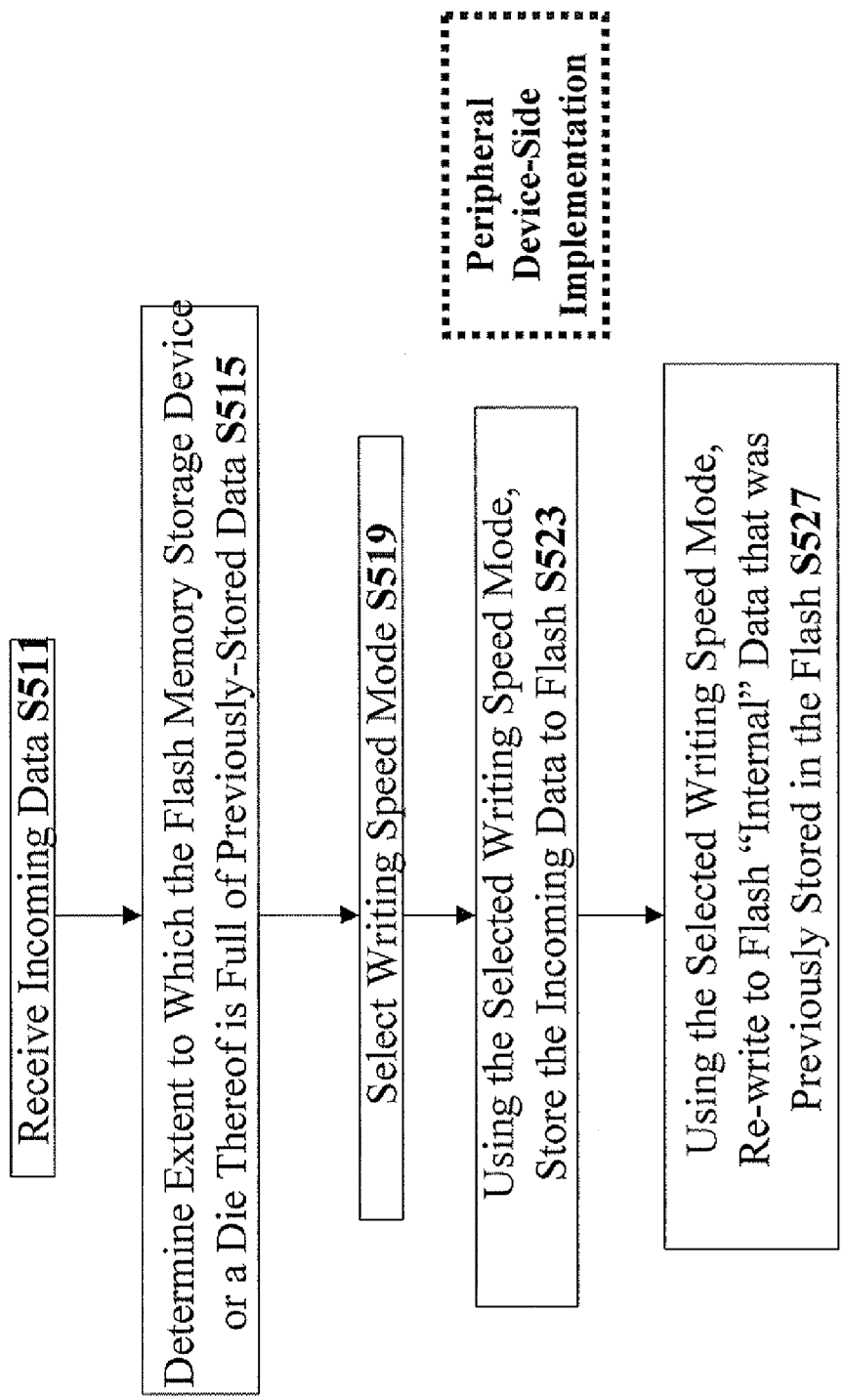
FIG. 12 is a generalization of the technique described in FIG. 6.

FIG. 12 is a generalization of the technique described in FIG. 6. In FIG. 12, Step S527 is analogous to step S127, except step S527 applies to the more general case.

Figure 13:
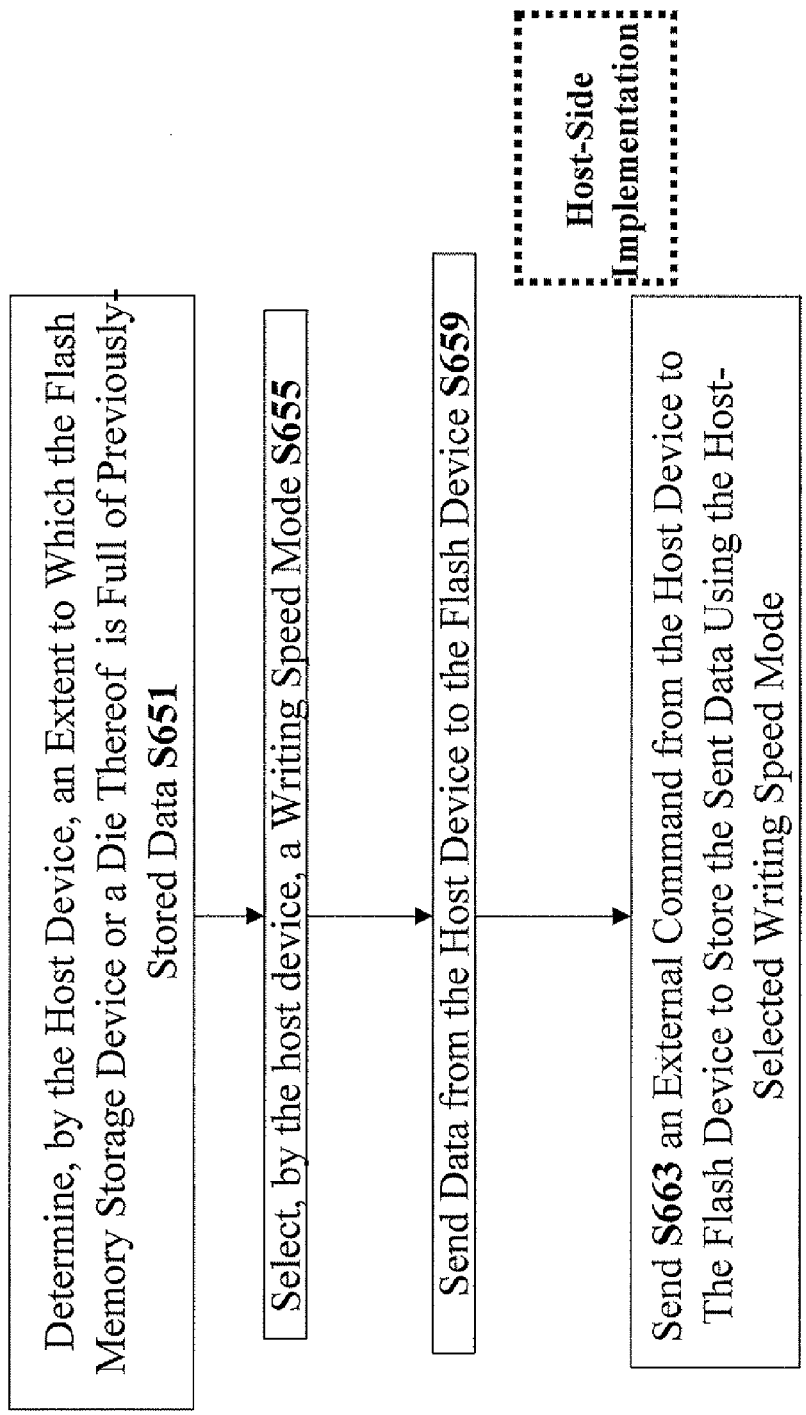
FIG. 13 is a generalization of the technique described in FIG. 7.

FIG. 13 is a generalization of the technique described in FIG. 7 (i.e. host-side implementation). In FIG. 13, step S651 is analogous to step S451, step S659 is analogous to step S459, and step S663 is analogous to step S463.

It is noted that step S655 of FIG. 13 is a generalization of step S455 of FIG. 7—i.e. FIG. 7 relates to the special case where "slow mode" vs. "fast mode" is established according to the number of bits per cell.

In exemplary embodiments, the technique of FIG. 13 is carried out by host device 310, as illustrated in FIG. 8.

Figure 14:
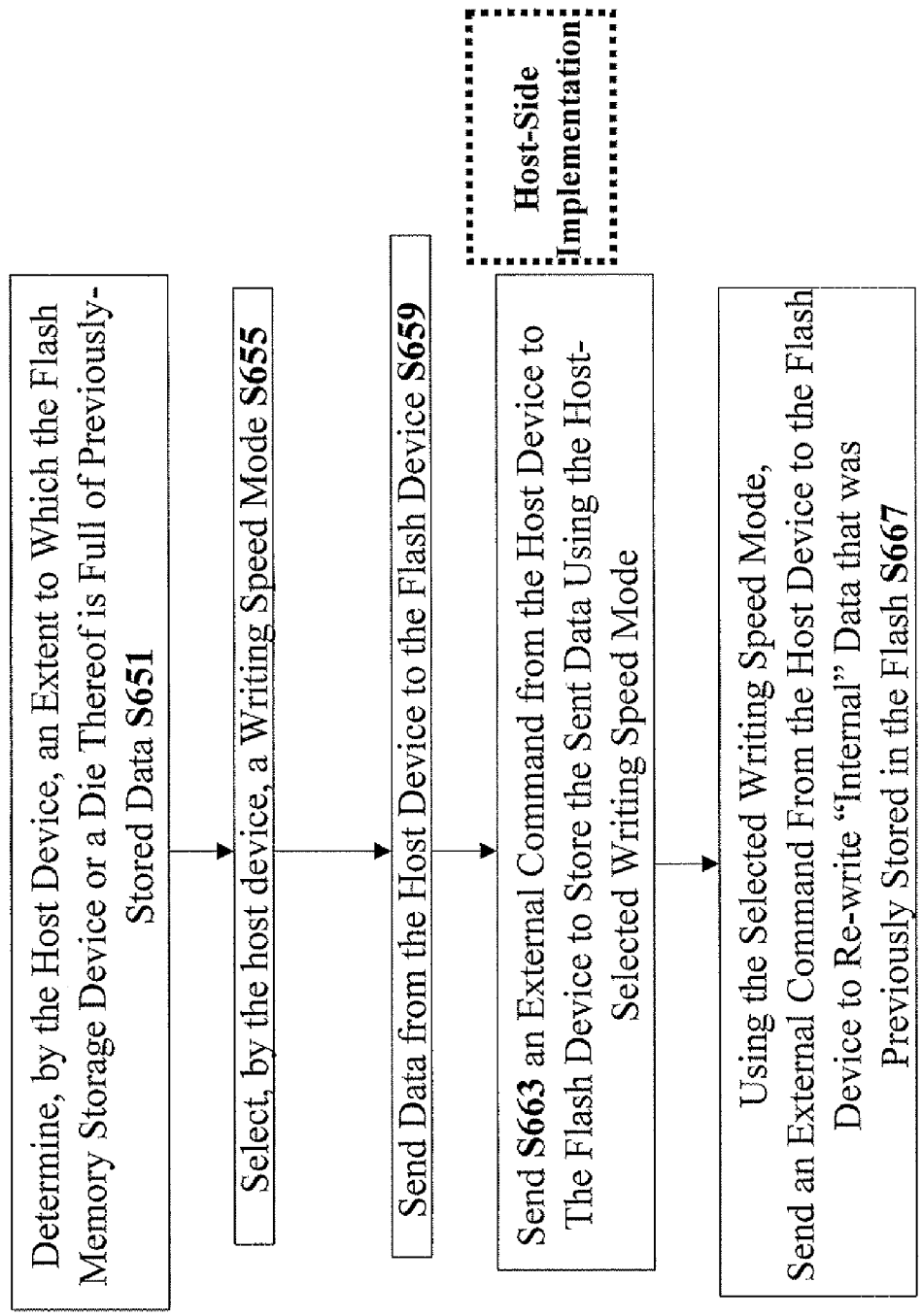
FIG. 14 is a generalization of the technique described in FIG. 9.

FIG. 14 is a generalization of the technique described in FIG. 9. In FIG. 14, Step S667 is analogous to step S467, except step S167 applies to the more general case.

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein Accordingly, the claims are not limited to the foregoing discussion.

What is claimed is:

1. A method of writing data into a flash memory storage device comprising:
   a) receiving incoming data, by the flash memory storage device, from a source external to the storage device;
   b) determining an extent to which the flash memory storage device is full of previously stored data;
   c) in response to receiving of the incoming data, selecting a bits-per-cell density mode based on the extent to which the flash memory storage device is full, to conserve space in the flash memory storage device; and
   d) in response to receiving of the incoming data, storing the received incoming data in the flash memory storage device using the selected bits-per-cell density mode.

2. The method of claim 1 wherein the method is carried out without, before the storing of step (d), storing the incoming data in the flash memory storage device using a bits-per-cell density mode other than the selected bits-per-cell density mode.

3. The method of claim 1 wherein the selecting is carried out in response to the receiving of the data of step (a).

4. The method of claim 1 wherein the selecting is carried out before the receiving of the data of step (a).

5. The method of claim 1 wherein the selecting of the bits-per-cell density mode includes:
   i) if the extent to which the storage device is full of the previously-stored data is less than a particular threshold, selecting a first bits-per-cell density mode; and
   ii) otherwise, selecting a second bits-per-cell density mode that stores more bits per cell than the first bits-per-cell density mode.

6. The method of claim 1 wherein the determining of the extent to which the storage device is full of previously stored data includes at least one of:
   i) determining a fraction of the storage device that is full of the previously stored data;
   ii) determining an absolute amount of previously-stored data stored in the storage device; and
   iii) determining an amount of free space on the storage device.

7. The method of claim 1 wherein the selecting of the bits-per-cell density mode includes:
   i) if the extent to which the storage device is full of previously stored data is below a first threshold, selecting a first bits-per-cell density mode;
   ii) if the extent to which the storage device is full of previously stored data exceeds the first threshold but is below a second threshold, selecting a second bits-per-cell density mode that stores more bits per cell than the first bits-per-cell density mode; and
   iii) if the extent to which the storage device is full of previously stored data exceeds the second threshold, selecting a third bits-per-cell density mode that stores more bits per cell than the second bits-per-cell density mode.

8. The method of claim 1 further comprising:
   e) reading at least some of the previously-stored data which is stored in a first bits-per-cell density mode; and
   f) re-writing at least some of the read data in the storage device in a second bits-per cell density mode which stores more bits per cell than the first bits-per-flash-cell density mode.

9. The method of claim 8 wherein the reading and the re-writing of data is effected by a background process.

10. The method of claim 8 wherein the method further comprises:
    g) receiving additional incoming data, by the flash memory storage device, from the source external to the storage device; and
    wherein the reading and re-writing is in response to the receiving of the additional incoming data.

11. A method of writing data into a flash memory storage device comprising:
    a) receiving incoming data, by the flash memory storage device, from a source external to the storage device;
    b) determining an extent to which the flash memory storage device is full of previously stored data;
    c) in response to receiving of the incoming data, selecting a writing speed mode based on the extent to which the flash memory storage device is full, to conserve space in the flash memory storage device; and
    d) in response to receiving of the incoming data, storing the received incoming data in the flash memory storage device using the selected writing speed mode.

12. The method of claim 11 wherein the method is carried out without, before the storing of step (d), storing the incoming data in the flash memory storage device using a writing speed mode other than the selected writing speed mode.

13. The method of claim 11 wherein the selecting is carried out in response to the receiving of the data of step (a).

14. The method of claim 11 wherein the selecting is carried out before the receiving of the data of step (a).

15. The method of claim 11 further comprising:
    e) reading at least some of the previously-stored data which was stored using a first writing speed mode; and
    f) re-writing at least some of the read data in the storage device using a second writing speed mode which is slower than the first writing speed mode.

16. The method of claim 15 wherein the method further comprises:
    g) receiving additional incoming data, by the flash memory storage device, from the source external to the storage device; and wherein the reading and re-writing is in response to the receiving of additional incoming data.

17. A method of writing data into a flash memory storage device by a host device coupled to the flash memory storage device, the method comprising:
   a) determining, by the host device, an extent to which the flash memory storage device is full of previously stored data;
   b) selecting, by the host device, a bits-per-cell density mode based on the extent to which the flash memory storage device is full, to conserve space in the flash memory storage device;
   c) sending the data-to-be-written from the host device to the flash memory storage device; and
   d) sending an external command from the host device to the flash memory storage device to store the sent data in the flash memory storage device using the selected bits-per-cell density mode.

18. The method of claim 17 wherein the determining, by the host device, of the extent to which the storage device is full of previously stored data includes at least one of:
   i) determining a fraction of the storage device that is full of the previously stored data;
   ii) determining an absolute amount of previously-stored data stored in the storage device; and
   iii) determining an amount of free space on the storage device.

19. A flash memory device comprising:
   a) a device interface for coupling with a host device;
   b) a flash memory; and
   c) a flash controller operative to:
      i) receive incoming data from the host device via the device interface;
      ii) determine an extent to which the flash memory is full of previously stored data;
      iii) in response to receiving of the incoming data, select a bits-per-cell density mode based on the extent to which the flash memory is full, to conserve space in the flash memory storage device; and
      iv) in response to receiving of the incoming data of (i), store the received incoming data in the flash memory using the selected bits-per-flash-cell density mode.

20. The flash memory device of claim 19 wherein the flash controller is operative to carry out steps (i)-(iv) without, before the carrying out of step (iv), storing the data in the flash memory storage device using a bits-per-cell density mode other than the selected bits-per-cell density mode.

21. The flash memory device of claim 19 wherein the flash controller is operative to carry out the selecting in response to the receiving of the data of step (i).

22. The flash memory device of claim 19 wherein the flash controller is operative to carry out the selecting before the receiving of the data of step (i).

23. The flash memory device of claim 19 wherein the flash controller is operative such that the selecting of the bits-per-cell density mode includes:
   A) if the extent to which the storage device is full of the previously-stored data is less than a particular threshold, selecting a first bits-per-cell density mode; and
   B) otherwise, selecting a second bits-per-cell density mode that stores more bits per cell than the first bits-per-cell density mode.

24. The flash memory device of claim 19 wherein the flash controller is operative such that the determining of the extent to which the storage device is full of previously stored data includes at least one of:
   A) determining a fraction of the storage device that is full of the previously stored data;
   B) determining an absolute amount of previously-stored data stored in the storage device; and
   C) determining an amount of free space on the storage device.

25. The flash memory device of claim 19 wherein the flash controller is operative such that the selecting of the bits-per-cell density mode includes:
   A) if the extent to which the storage device is full of previously stored data is below a first threshold, selecting a first bits-per-cell density mode;
   B) if the extent to which the storage device is full of previously stored data exceeds the first threshold but is below a second threshold, selecting a second bits-per-cell density mode that stores more bits per cell than the first bits-per-cell density mode; and
   C) if the extent to which the storage device is full of previously stored data exceeds the second threshold, selecting a third bits-per-cell density mode that stores more bits per cell than the second bits-per-cell density mode.

26. The flash memory device of claim 19 wherein the flash controller is further operative to:
   v) read at least some of the previously-stored data which is stored in a first bits-per-cell density mode; and
   vi) re-write at least some of the read data in the storage device in a second bits-per cell density mode which stores more bits per cell than the first bits-per-flash-cell density mode.

27. The flash memory device of claim 26 wherein the flash controller is operative to effect the reading and the re-writing of data in the background.

28. The flash memory device of claim 26 wherein the flash controller is further operative to:
   vii) receive additional incoming data, by the flash memory storage device, from the source external to the storage device; and
   wherein the reading and re-writing is in response to the receiving of the additional incoming data.

29. A flash memory device comprising:
   a) a device interface for coupling with a host device;
   b) a flash memory; and
   c) a flash controller operative to:
      i) receive incoming data from the host device via the device interface;
      ii) determine an extent to which the flash memory is full of previously stored data;
      iii) in response to receiving of the incoming data, select a writing speed mode based on the extent to which the flash memory is full, to conserve space in the flash memory; and
      iv) in response to receiving of the incoming data of (i), store the received incoming data in the flash memory using the selected writing speed mode.

30. The flash memory device of claim 29 wherein the flash controller is operative to carry out steps (i)-(iv) without, before the carrying out of step (iv), storing the data in the flash memory storage device using a writing speed mode other than the selected writing speed mode.

31. The flash memory device of claim 29 wherein the flash controller is operative to carry out the selecting in response to the receiving of the data of step (i).

32. A method of writing data into a flash memory storage device having a plurality of flash memory dies, the method comprising:

a) receiving incoming data, by the flash memory storage device, from a source external to the storage device;
b) determining an extent to which a die of the flash memory storage device is full of previously stored data;
c) in response to receiving of the incoming data, selecting a bits-per-cell density mode based on the extent to which the die of the flash memory storage device is full, to conserve space in the flash memory storage device; and
d) in response to receiving of the incoming data, storing the received incoming data in the flash memory storage device using the selected bits-per-cell density mode.

33. The method of claim 32 wherein the method is carried out without, before the storing of step (d), storing the incoming data in the flash memory storage device using a bits-per-cell density mode other than the selected bits-per-cell density mode.

34. The method of claim 32 wherein the selecting is carried out in response to the receiving of the data of step (a).

35. The method of claim 32 wherein the selecting is carried out before the receiving of the data of step (a).

36. A method of writing data into a flash memory storage device having a plurality of flash memory dies comprising:
a) receiving incoming data, by the flash memory storage device, from a source external to the storage device;
b) determining an extent to which a die of the flash memory storage device is full of previously stored data;
c) in response to receiving of the incoming data, selecting a writing speed mode based on the extent to which the die of the flash memory storage device is full, to conserve space in the flash memory storage device; and
d) in response to receiving of the incoming data, storing the received incoming data in the flash memory storage device using the selected writing speed mode.

37. A flash memory device comprising:
a) a device interface for coupling with a host device;
b) a flash memory including a plurality of flash memory dies; and
c) a flash controller operative to:
  i) receive incoming data from the host device via the device interface;
  ii) determine an extent to which a die of the flash memory is full of previously stored data;
  iii) in response to receiving of the incoming data, select a bits-per-cell density mode based on the extent to which the die of the flash memory is full, to conserve space in the flash memory; and
  iv) in response to receiving of the incoming data of (i), store the received incoming data in the flash memory using the selected bits-per-flash-cell density mode.

38. The flash memory device of claim 37 wherein the flash controller is operative to carry out steps (i)-(iv) without, before the carrying out of step (iv), storing the data in the flash memory storage device using a bits-per-cell density mode other than the selected bits-per-cell density mode.

39. The flash memory device of claim 37 wherein the flash controller is operative to carry out the selecting in response to the receiving of the data of step (i).

40. The flash memory device of claim 37 wherein the flash controller is operative to carry out the selecting before the receiving of the data of step (i).

41. A flash memory device comprising:
a) a device interface for coupling with a host device;
b) a flash memory including a plurality of flash memory dies; and
c) a flash controller operative to:
  i) receive incoming data from the host device via the device interface;
  ii) determine an extent to which a die of the flash memory is full of previously stored data;
  iii) in response to receiving of the incoming data, select a writing speed mode based on the extent to which the die of the flash memory is full, to conserve space in the flash memory; and
  iv) in response to receiving of the incoming data of (i), store the received incoming data in the flash memory using the selected writing speed mode.

42. The flash memory device of claim 41 wherein the flash controller is operative to carry out steps (i)-(iv) without, before the carrying out of step (iv), storing the data in the flash memory storage device using a writing speed mode other than the selected writing speed mode.

43. The flash memory device of claim 41 wherein the flash controller is operative to carry out the selecting in response to the receiving of the data of step (i).

44. The flash memory device of claim 41 wherein the flash controller is operative to carry out the selecting before the receiving of the data of step (i).

* * * * *